United States Patent
Gao et al.

(10) Patent No.: US 12,002,229 B2
(45) Date of Patent: Jun. 4, 2024

(54) ACCELERATING SPECKLE IMAGE BLOCK MATCHING USING CONVOLUTION TECHNIQUES

(71) Applicant: Ambarella International LP, Santa Clara, CA (US)

(72) Inventors: Wenhai Gao, Shanghai (CN); Liangliang Wang, Shanghai (CN); Bo Yu, Shanghai (CN)

(73) Assignee: Ambarella International LP, Santa Clara, CA (US)

(*) Notice: Subject to any disclaimer, the term of this patent is extended or adjusted under 35 U.S.C. 154(b) by 438 days.

(21) Appl. No.: 17/479,034

(22) Filed: Sep. 20, 2021

(65) Prior Publication Data

US 2023/0072702 A1 Mar. 9, 2023

(30) Foreign Application Priority Data

Sep. 9, 2021 (CN) .......................... 202111059588.4

(51) Int. Cl.
*G06T 7/521* (2017.01)
*G06N 3/02* (2006.01)
(Continued)

(52) U.S. Cl.
CPC .............. *G06T 7/521* (2017.01); *G06N 3/02* (2013.01); *G06V 10/443* (2022.01); *G06V 10/50* (2022.01)

(58) Field of Classification Search
CPC ........... G06T 7/521; G06T 2207/10024; G06T 2207/10048; G06T 2207/20084;
(Continued)

(56) References Cited

U.S. PATENT DOCUMENTS

2019/0180459 A1* 6/2019 Shi .......................... G06T 7/521
2020/0099920 A1* 3/2020 Khamis .................... G06T 7/90
(Continued)

OTHER PUBLICATIONS

Wang, G., Yin, X., Pei, X., & Shi, C. (2013). Depth estimation for speckle projection system using progressive reliable points growing matching. Applied optics, 52(3), 516-524. (Year: 2013).*

(Continued)

*Primary Examiner* — Amandeep Saini
*Assistant Examiner* — Giang Thi Han Nguyen
(74) *Attorney, Agent, or Firm* — Maiorana Patent Law, PA

(57) ABSTRACT

An apparatus comprising an interface, a light projector and a processor. The interface may be configured to receive pixel data. The light projector may be configured to generate a structured light pattern. The processor may be configured to process the pixel data arranged as video frames and generate disparity and depth maps. The processor may comprise convolutional neural network hardware that may arrange reference images into a tensor, perform logical operations on one of the video frames in a depth direction of the tensor to generate a tensor of feature maps of the video frames, use a convolution to reduce an amount of calculations performed in the depth direction of the tensor of feature maps, perform convolution filtering on the tensor of the feature maps, determine an index map location, and search lookup data based on the index map location to determine the disparity and depth maps.

20 Claims, 19 Drawing Sheets

(51) Int. Cl.
*G06V 10/44* (2022.01)
*G06V 10/50* (2022.01)

(58) Field of Classification Search
CPC ........ G06N 3/02; G06N 3/0464; G06N 3/063; G06V 10/443; G06V 10/50; G06V 10/454; G06V 10/82
See application file for complete search history.

(56) References Cited

U.S. PATENT DOCUMENTS

| | | | |
|---|---|---|---|
| 2020/0286247 A1* | 9/2020 | Niesen | G01S 17/86 |
| 2020/0304802 A1* | 9/2020 | Habibian | G06F 18/21 |

OTHER PUBLICATIONS

Gondimalla, A., Chesnut, N., Thottethodi, M., & Vijaykumar, T. N. (Oct. 2019). SparTen: A sparse tensor accelerator for convolutional neural networks. In Proceedings of the 52nd Annual IEEE/ACM International Symposium on Microarchitecture (pp. 151-165). (Year: 2019).*

C.-L. Liu, W.-H. Hsaio and Y.-C. Tu, "Time Series Classification With Multivariate Convolutional Neural Network," in IEEE Transactions on Industrial Electronics, vol. 66, No. 6, pp. 4788-4797, Jun. 2019, doi: 10.1109/TIE.2018.2864702. (Year: 2019).*

* cited by examiner

ACCELERATING SPECKLE IMAGE BLOCK MATCHING USING CONVOLUTION TECHNIQUES

FIELD OF THE INVENTION

The invention relates to computer vision generally and, more particularly, to a method and/or apparatus for implementing accelerating speckle image block matching using convolution techniques.

BACKGROUND

There has been a rapid development in machine vision, optical technology, and artificial intelligence. Three-dimensional (3D) reconstruction has become an important branch of machine vision due to advancements in robotics and deep learning technology. Conventional 3D reconstruction technology has problems for real-time applications. The speed of 3D reconstruction is not fast enough and the accuracy of the 3D reconstruction is not accurate enough.

There are mainly two types of methods of 3D reconstruction based on machine vision, active vision methods and passive vision methods. Active vision methods include time-of-flight method, structured light method, holographic interferometry, moiré method, etc. Passive vision methods include binocular stereo vision, motion vision, defocusing method, shading method, focusing method, etc.

One method of active 3D reconstruction is performed using a monocular speckle structured light system. Results of 3D reconstruction using the monocular speckle structured light are affected by various factors such as the power of the speckle projector, temporal noise, spatial noise, reflectivity of the detected object, etc. Due to the lack of speed and accuracy of the 3D reconstruction, applications are generally limited to scenarios that do not require high accuracy, such as three-dimensional face recognition and face live detection. Current speckle structure algorithms are designed to be executed on general purpose processors, which results in speed that is not satisfactory.

Generally, the acceleration of block matching algorithms that are based on speckle structured light are still based on the matching speed of the algorithm. Conventional research for accelerating block matches involves using the original image to match the 192 reference offset images that need to be matched. Even a well-optimized single-matching algorithm has an unsatisfactory speed on the general purpose processor.

It would be desirable to implement accelerating speckle image block matching using convolution techniques.

SUMMARY

The invention concerns an apparatus comprising an interface, a structured light projector and a processor. The interface may be configured to receive pixel data. The structured light projector may be configured to generate a structured light pattern. The processor may be configured to process the pixel data arranged as video frames, preprocess a plurality of reference images comprising the structured light pattern, generate lookup data and perform convolution operations to generate a disparity map and a depth map in response to the video frames, the structured light pattern, the reference images and the lookup data. The processor may comprise convolutional neural network hardware that may arrange the plurality of reference images into a four-dimensional tensor, perform logical operations on one of the video frames in a depth direction of the four-dimensional tensor to generate a tensor of feature maps of the video frames, use a horizontal and vertical separation convolution and dilation to reduce an amount of calculations performed to implement convolution filtering in the depth direction of the tensor of feature maps, perform the convolution filtering on the tensor of the feature maps, determine a depth dimension index value in response to a maximum value calculation performed in the depth direction of the tensor of feature maps, determine an index map location, and search the lookup data based on the index map location to determine the disparity map and the depth map.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
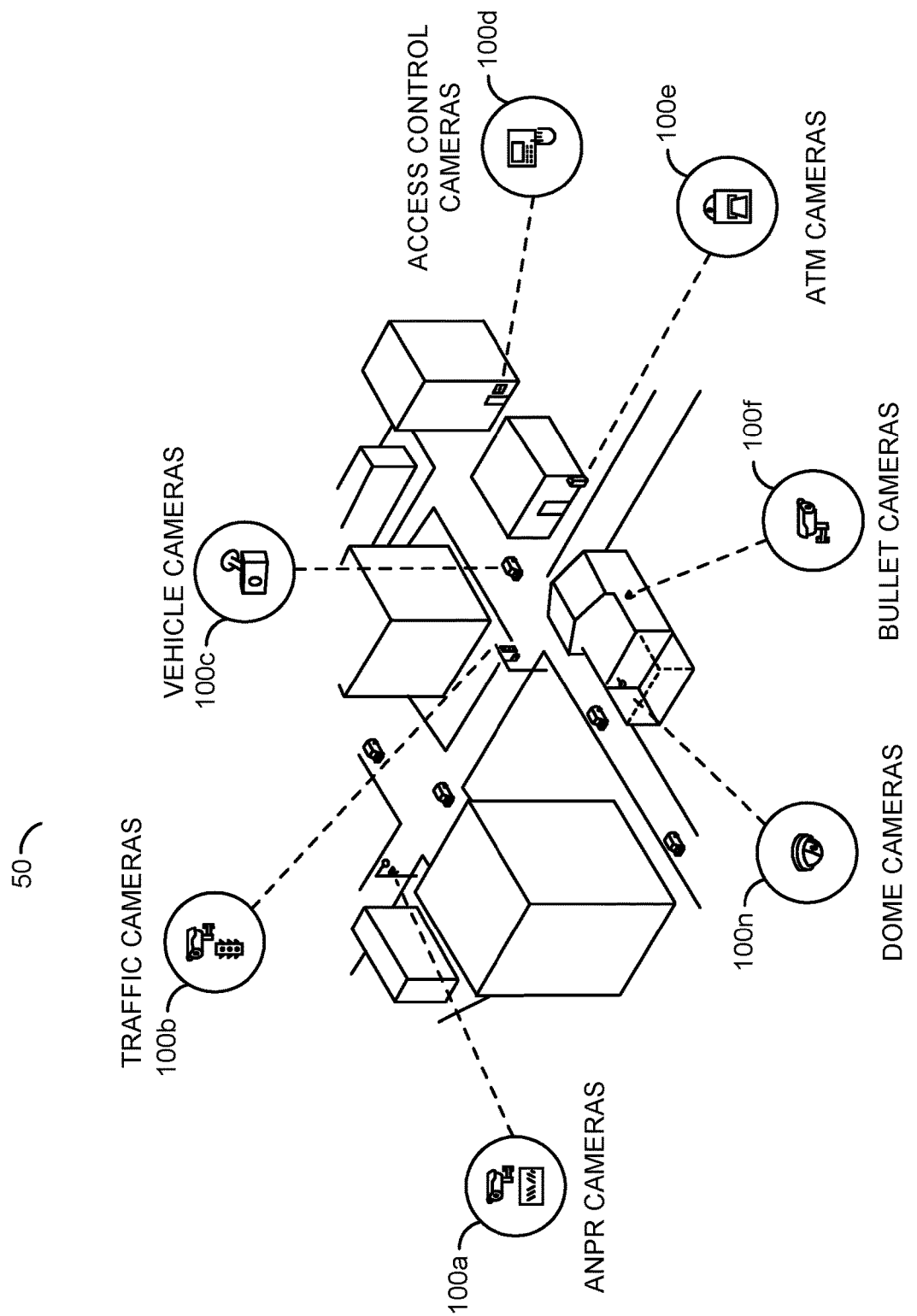
FIG. 1 is a diagram illustrating examples of edge devices that may utilize a processor configured to implement a convolutional neural network in accordance with example embodiments of the invention.

Embodiments of the present invention include providing accelerating speckle image block matching using convolution techniques that may (i) be performed by a processor on an edge device, (ii) utilize convolutional neural networks implemented on a processor, (iii) preprocess reference images into a four-dimensional tensor for different distances of monocular structured light, (iv) utilize the reference images arranged in a four-dimensional tensor to improve subsequent data parallelization for calculations, (v) perform convolution filtering for cost calculation to accelerate performance, (vi) implement separable hole convolution operations to reduce dimensionality of a large-sized convolution kernel, (vii) generate a tensor of feature maps arranged to reduce repetitive calculations of a convolution operation, (viii) implement lookup data for generating depth maps and disparity maps based on a maximum depth dimension index map, (ix) improve Z-accuracy while reducing calculation time, (x) utilize convolution operations implemented in hardware and/or (xi) be implemented as one or more integrated circuits.

Embodiments of the present invention may be implemented using a video processor. The video processor may comprise hardware dedicated to implementing convolutional neural networks. The dedicated hardware for implementing the convolutional neural networks may be configured to provide acceleration processing for convolution operations. The hardware accelerated processing provided by the dedicated hardware for implementing the convolutional neural networks may enable edge devices to perform various operations for block matching using convolution techniques. Without the hardware accelerated processing, the convolution techniques may be impractical to implement (e.g., performance may be too slow for real-time applications).

Embodiments of the present invention may be configured to implement a processor comprising hardware modules designed to accelerate operations for performing deep learning. The hardware modules may be leveraged to enable hardware acceleration for original speckle structured light matching techniques. The processor may be designed for hardware acceleration for various operations used for a convolutional neural network. Embodiments of the present invention may be configured to use the hardware acceleration to achieve the acceleration of the speckle structured light matching techniques.

The dedicated hardware for implementing convolutional neural networks may be configured to accelerate various operations for block matching for generating depth maps and disparity maps based on speckle structured light images for monocular 3D reconstruction. Embodiments of the present invention may be configured to arrange data in a format that enables parallelization of calculations and/or may be usable by (e.g., supported within the constraints of) the hardware modules that implement the convolutional neural network. The dedicated hardware for implementing convolutional neural networks may be configured to perform various convolutional operations on the parallelized data to reduce the number of calculations.

Embodiments of the present invention may be configured to implement a horizontal and a vertical separation convolution and a cavity convolution (or a cavity convolution, or a hollow convolution or a dilation). The horizontal and vertical separation convolution and hole calculation may be implemented to reduce the number of calculations performed for a monocular speckle structured light block matching technique. The horizontal and vertical convolution separation operations may be implemented to reduce the number of calculations for summing blocks compared to conventional block matching techniques. The method of hollow convolution (or cavity convolution or hole convolution) may be used to reduce a number of calculations for performing a vertical block summation and a horizontal block summation compared to conventional techniques. The hardware acceleration implemented may be configured to speed up block matching techniques for analyzing speckle structured light.

A disparity map lookup table and a depth map lookup table (e.g., lookup data) may be prepared offline. Reference images may be used to perform block matching with input video frames (e.g., newly captured video data). The reference images and the input video frames may comprise video data of an environment with the structured light pattern. The reference images may be captured and prepared offline. A matching result performed on the input video frames may be used to search the disparity map table and the depth map table in order to generate disparity maps and depth maps based on the input video data. In an example, the reference images, the disparity table and the lookup table may comprise static data. The video data may comprise dynamic input data based on the capture of new incoming video frames with the structured light pattern.

Referring to FIG. 1, a diagram illustrating examples of edge devices that may utilize a convolutional neural network in accordance with example embodiments of the invention is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. The design, type and/or application performed by the edge devices 100a-100n may be varied according to the design criteria of a particular implementation.

Figure 2:
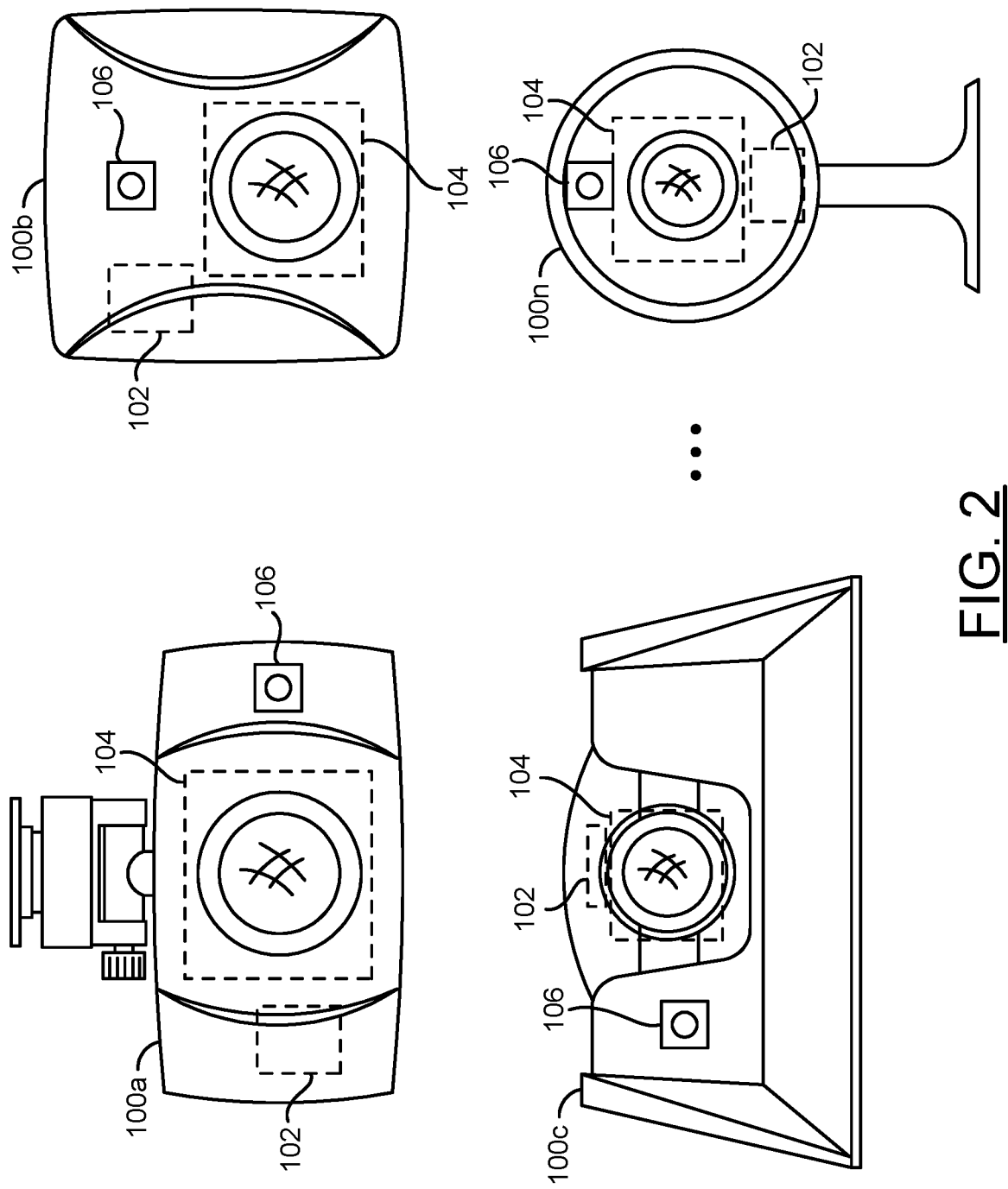
FIG. 2 is a diagram illustrating example cameras implementing an example embodiment of the present invention.

Referring to FIG. 2, a diagram illustrating example edge device cameras implementing an example embodiment of the present invention is shown. The camera systems 100a-100n are shown. Each camera device 100a-100n may have a different style and/or use case. For example, the camera 100a may be an action camera, the camera 100b may be a ceiling mounted security camera, the camera 100n may be webcam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a processor. The circuit 104 may implement a capture device. The circuit 106 may implement a structured light projector. The camera systems 100a-100n may comprise other components (not shown). Details of the components of the cameras 100a-100n may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The structured light projector 106 may be configured to generate a structured light pattern (e.g., a speckle pattern). The structured light pattern may be projected onto a background (e.g., the environment). The capture device 104 may capture the pixel data comprising a background image (e.g., the environment) with the speckle pattern.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other. For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 3:
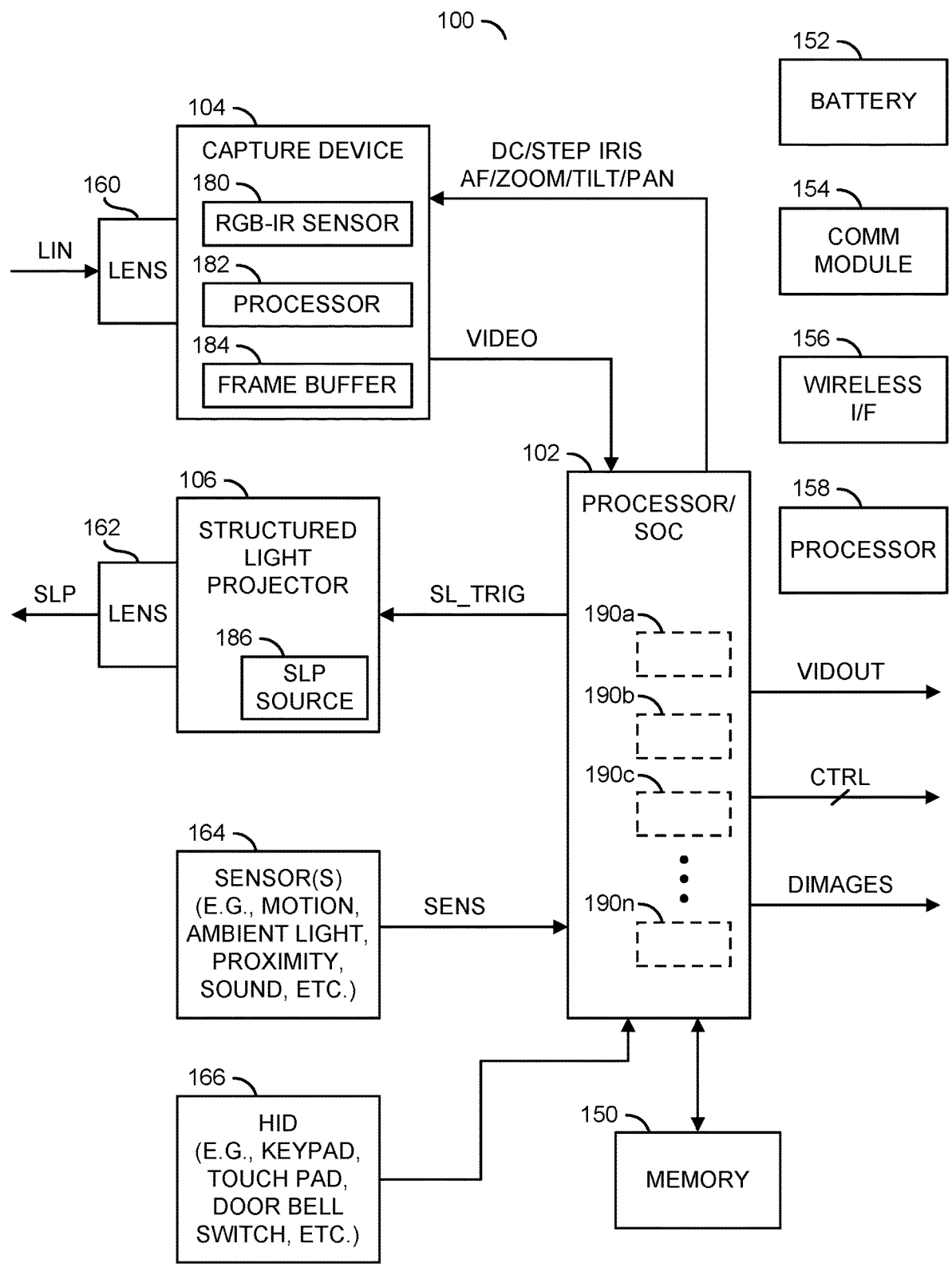
FIG. 3 is a diagram illustrating a block diagram of a camera system.

Referring to FIG. 3, a block diagram of the camera system 100 is shown illustrating an example implementation. In an example, the camera system 100 may comprise the processor/SoC 102, the capture device 104, and the structured light projector 106 as shown in association with FIG. 2. The camera system 100 may further comprise a block (or circuit) 150, a block (or circuit) 152, a block (or circuit) 154, a block (or circuit) 156, a block (or circuit) 158, a block (or circuit) 160, a block (or circuit) 162, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the capture device 104, the IR structured light projector 106, the memory 150, the lens 160, the IR structured light projector 106, the structured light pattern lens 162, the sensors 164, the battery 152, the communication module 154, the wireless interface 156 and the processor 158. In another example, the camera system 100 may comprise processor/SoC 102, the capture device 104, the structured light projector 106, the processor 158, the lens 160, the structured light pattern lens 162, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

The processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames.

The memory 150 may store data. The memory 150 may implement various types of memory including, but not limited to, a cache, flash memory, memory card, random access memory (RAM), dynamic RAM (DRAM) memory, etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets and/or metadata information. In some embodiments, the memory 150 may store reference images. The reference images may be used for computer vision operations, 3D reconstruction, etc.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, etc.) stored in the memory 150. In an example, the memory 150 may store one or more directed acyclic graphs (DAGs) and one or more sets of weights and biases defining the one or more artificial neural network models. The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 106. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The structured light projector 106 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the camera system 100. The structured light pattern SLP may be captured by the capture device 104 as part of the light input LIN.

The structured light pattern lens 162 may be a lens for the structured light projector 106. The structured light pattern lens 162 may be configured to enable the structured light SLP generated by the structured light source 186 of the structured light projector 106 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 164 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO and the signal SENS. The processor/SoC 102 may generate one or more video output signals (e.g., VIDOUT), one or more control signals (e.g., CTRL) and/or one or more depth data signals (e.g., DIMAGES) based on the signal VIDEO, the signal SENS, and/or other input. In some embodiments, the signals VIDOUT, DIMAGES and CTRL may be generated based on analysis of the signal VIDEO and/or objects detected in the signal VIDEO.

In various embodiments, the processor/SoC 102 may be configured to perform one or more of feature extraction, object detection, object tracking, 3D reconstruction and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 150, the communications module 154, and/or the wireless interface 156. In some embodiments, the video signal VIDOUT and/or the depth data signal DIMAGES may be used internally by the processor 102 (e.g., not presented as output).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operations of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The processor 102 may be configured to generate the signal CTRL in response to sensor fusion operations (e.g., aggregating information received from disparate sources). The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern SLP.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831, 549, filed on Apr. 16, 2020, U.S. patent application Ser. No. 16/288,922, filed on Feb. 28, 2019, U.S. patent application Ser. No. 15/593,493 (now U.S. Pat. No. 10,437,600), filed on May 12, 2017, U.S. patent application Ser. No. 15/931, 942, filed on May 14, 2020, U.S. patent application Ser. No. 16/991,344, filed on Aug. 12, 2020, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameter (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 4:
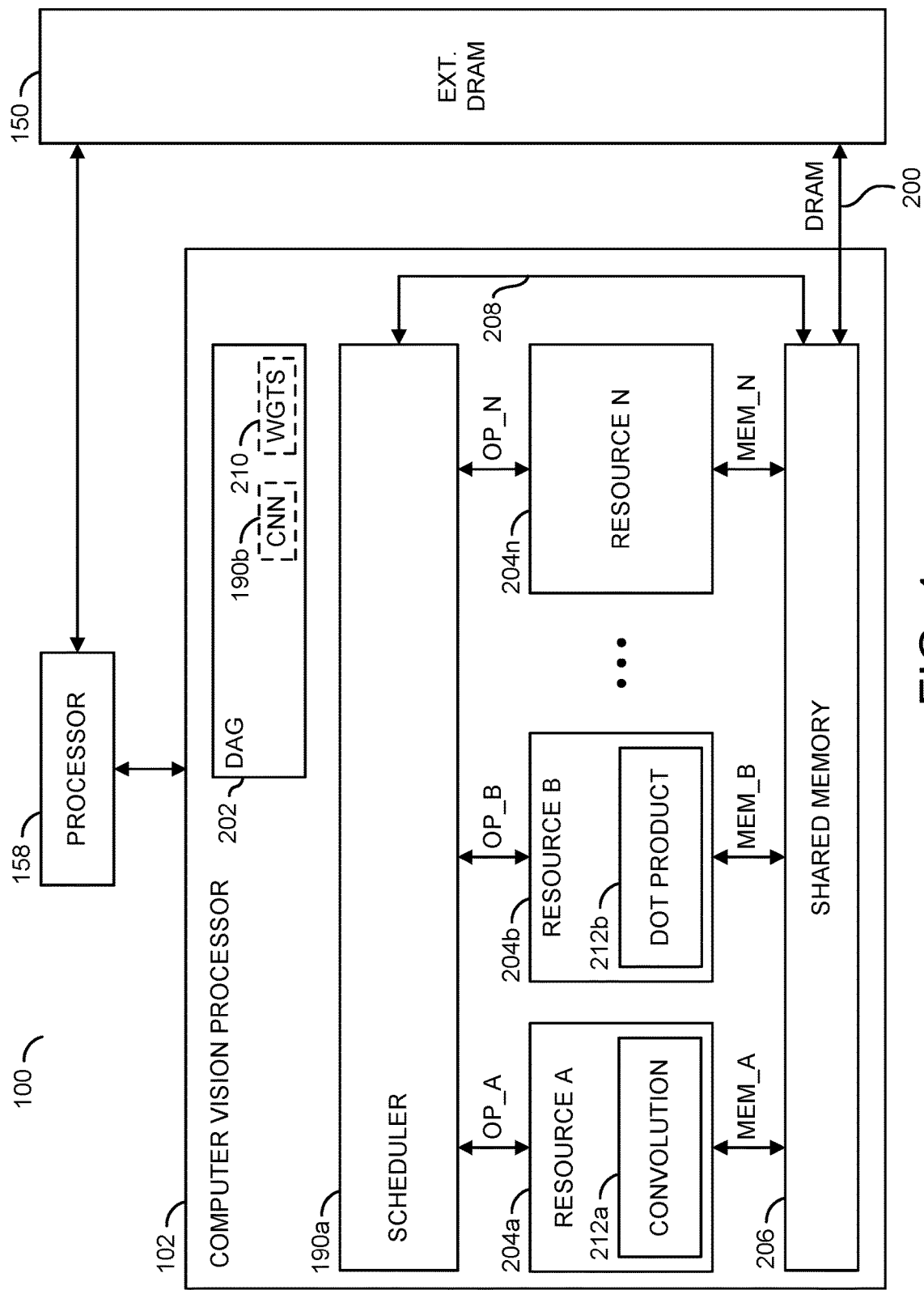
FIG. 4 is a diagram illustrating processing circuitry of a camera system implementing a convolutional neural network configured to perform 3D reconstruction.

Referring to FIG. 4, a diagram illustrating processing circuitry of a camera system implementing a convolutional neural network configured to perform 3D reconstruction is shown. In an example, processing circuitry of the camera system 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the camera system 100 generally comprises hardware circuitry that is optimized to provide a high performance image processing and computer vision pipeline in a minimal area and with minimal power consumption. In an example, various operations used to perform image processing, feature detection/extraction, 3D reconstruction and/or object detection/classification for computer (or machine) vision may be implemented using hardware modules designed to reduce computational complexity and use resources efficiently.

In an example embodiment, the processing circuit 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In an example, the processor 102 may be an intelligent vision processor. The memory 150 may implement an external memory (e.g., a memory external to the circuits 158 and 102). In an example, the circuit 150 may be implemented as a dynamic random access memory (DRAM) circuit. The processing circuitry of the camera system 100 may comprise other components (not shown). The number, type and/or arrangement of the components of the processing circuitry of the camera system 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190a, a block (or circuit) 202, one or more blocks (or circuits) 204a-204n, a block (or circuit) 206 and a path 208. The block 202 may implement a directed acyclic graph (DAG) memory. The DAG memory 202 may comprise the CNN module 190b and/or weight/bias values 210. The blocks 204a-204n may implement hardware resources (or engines). The block 206 may implement a shared memory circuit. In an example embodiment, one or more of the circuits 204a-204n may comprise blocks (or circuits) 212a-212n. In the example shown, the circuit 212a and the circuit 212b are implemented as representative examples in the respective hardware engines 204a-204b. One or more of the circuit 202, the circuits 204a-204n and/or the circuit 206 may be an example implementation of the hardware modules 190a-190n shown in association with FIG. 3.

In an example, the processor 158 may be configured to program the circuit 102 with one or more pre-trained artificial neural network models (ANNs) including the convolutional neural network (CNN) 190b having multiple output frames in accordance with embodiments of the invention and weights/kernels (WGTS) 210 utilized by the CNN module 190b. In various embodiments, the CNN module 190b may be configured (trained) for operation in an edge device. In an example, the processing circuitry of the camera system 100 may be coupled to a sensor (e.g., video camera, etc.) configured to generate a data input. The processing circuitry of the camera system 100 may be configured to generate one or more outputs in response to the data input from the sensor based on one or more inferences made by executing the pre-trained CNN module 190b with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190b, and generated by software (e.g., a directed acyclic graph, etc.) that specifies processing (e.g., computer vision, 3D reconstruction, etc.) tasks. In some embodiments, the processor 102 may be a representative example of numerous computer vision processors implemented by the processing circuitry of the camera system 100 and configured to operate together.

In an example, the circuit 212a may implement convolution operations. In another example, the circuit 212b may be configured to provide dot product operations. The convolution and dot product operations may be used to perform computer (or machine) vision tasks (e.g., as part of an object detection process, etc.). In yet another example, one or more of the circuits 204c-204n may comprise blocks (or circuits) 212c-212n (not shown) to provide convolution calculations in multiple dimensions. In still another example, one or more of the circuits 204a-204n may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190b using the circuits 190a, 204a-204n, and 206.

Multiple signals (e.g., OP_A-OP_N) may be exchanged between the circuit 190a and the respective circuits 204a-204n. Each of the signals OP_A-OP_N may convey execution operation information and/or yield operation information. Multiple signals (e.g., MEM_A-MEM_N) may be exchanged between the respective circuits 204a-204n and the circuit 206. The signals MEM_A-MEM_N may carry data. A signal (e.g., DRAM) may be exchanged between the circuit 150 and the circuit 206. The signal DRAM may transfer data between the circuits 150 and 190a (e.g., on the transfer path 208).

The circuit 190a may implement a scheduler circuit. The scheduler circuit 190a is generally operational to schedule tasks among the circuits 204a-204n to perform a variety of computer vision related tasks as defined by the processor 158. Individual tasks may be allocated by the scheduler circuit 190a to the circuits 204a-204n. The scheduler circuit 190a may allocate the individual tasks in response to parsing the directed acyclic graphs (DAGs) provided by the processor 158. The scheduler circuit 190a may time multiplex the tasks to the circuits 204a-204n based on the availability of the circuits 204a-204n to perform the work.

Each circuit 204a-204n may implement a processing resource (or hardware engine). The hardware engines 204a-204n are generally operational to perform specific processing tasks. The hardware engines 204a-204n may be implemented to include dedicated hardware circuits that are optimized for high-performance and low power consumption while performing the specific processing tasks. In some configurations, the hardware engines 204a-204n may operate in parallel and independent of each other. In other configurations, the hardware engines 204a-204n may operate collectively among each other to perform allocated tasks.

The hardware engines 204a-204n may be homogenous processing resources (e.g., all circuits 204a-204n may have the same capabilities) or heterogeneous processing resources (e.g., two or more circuits 204a-204n may have different capabilities). The hardware engines 204a-204n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204a-204n may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204a-204n implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference.

In various embodiments, the hardware engines 204a-204n may be implemented solely as hardware circuits. In some embodiments, the hardware engines 204a-204n may be implemented as generic engines that may be configured through circuit customization and/or software/firmware to operate as special purpose machines (or engines). In some embodiments, the hardware engines 204a-204n may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204a-204n may be selected for a particular process and/or thread by the scheduler 190a. The scheduler 190a may be configured to assign the hardware engines 204a-204n to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190a and/or the hardware engines 204a-204n). In an example, the shared memory circuit 206 may implement an on-chip memory for the computer vision processor 102. The shared memory 206 is generally operational to store all of or portions of the multidimensional arrays (or vectors) of input data elements and output data elements generated and/or utilized by the hardware engines 204a-204n. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190a to the shared memory 206. The transfer path 208 may also be operational to move data from the shared memory 206 to the scheduler circuit 190a.

The processor 158 is shown communicating with the computer vision processor 102. The processor 158 may be configured as a controller for the computer vision processor 102. In some embodiments, the processor 158 may be configured to transfer instructions to the scheduler 190a. For example, the processor 158 may provide one or more directed acyclic graphs to the scheduler 190a via the DAG memory 202. The scheduler 190a may initialize and/or configure the hardware engines 204a-204n in response to parsing the directed acyclic graphs. In some embodiments, the processor 158 may receive status information from the scheduler 190a. For example, the scheduler 190a may provide a status information and/or readiness of outputs from the hardware engines 204a-204n to the processor 158 to enable the processor 158 to determine one or more next instructions to execute and/or decisions to make. In some embodiments, the processor 158 may be configured to communicate with the shared memory 206 (e.g., directly or through the scheduler 190a, which receives data from the shared memory 206 via the path 208). The processor 158 may be configured to retrieve information from the shared memory 206 to make decisions. The instructions performed by the processor 158 in response to information from the computer vision processor 102 may be varied according to the design criteria of a particular implementation.

Figure 5:
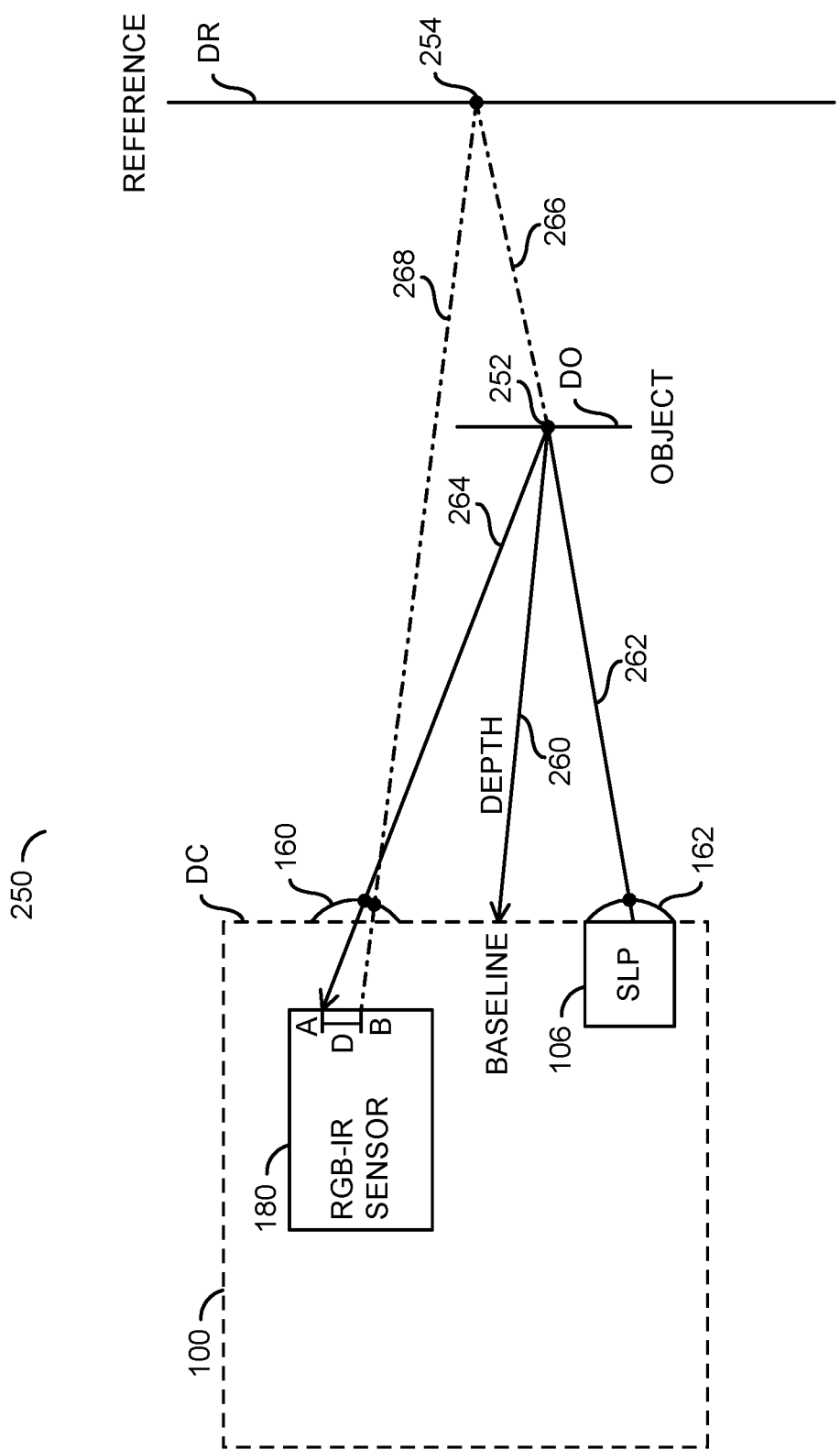
FIG. 5 is a diagram illustrating monocular structured light depth estimation.

Referring to FIG. 5, a diagram illustrating monocular structured light depth estimation is shown. A scenario 250 is shown. The scenario 250 may comprise the camera device 100, an object 252 and a reference location 254. The structured light projector 106, the lens 160, the structured light pattern lens 162 and the image sensor 180 are shown. Other components of the camera device 100 have been omitted for clarity.

A location DC is shown at the camera device 100. The location DC may represent a baseline location of the lens 160 and the structured light pattern lens 162. A location DO is shown. The location DO may represent a distance of the object 252 from the baseline location DC of the camera device 100. In an example, the object 252 may be a distance of DO from the camera device 100. A location DR is shown. The location DR may represent a distance of the reference location 254 from the baseline location DC of the camera device 100. In an example, the reference location 254 may be a distance DR from the camera device 100.

The object 252 is shown at the distance DO from the baseline location DC. The object 252 may be located at the distance DO, which may be closer to the lens 160 than the reference location 254. For example, the object 252 may be at some distance DO in between the baseline location DC and the reference location DR. The object 252 is shown at some location in between the structured light projector lens 162 and the lens 160. For example, the object 252 is shown offset from both the structured light projector lens 162 and the lens 160. The object 252 may be representative of a person, an animal, a vehicle, an inanimate object (e.g., a curb, a road sign, a bicycle, tree, a box, etc.), etc. The type, size, shape, distance from the camera device 100 and/or distance from the reference location 254 of the object 252 may be varied according to the design criteria of a particular implementation.

The reference location 254 may be an example of content in a reference image. The reference location 254 may be some distance from the camera device 100 that is within the range of the structured light SLP that may be generated by the structured light projector 106. The reference location 254 may be used by the processor 102 as a basis of comparison for incoming video frames. In an example, new incoming video frames may be compared to reference video frames. The reference video frames may comprise images of the structured light pattern SLP at various distances (e.g., the reference location 254 may be one of the various distances for the reference images). The processor 102 may be configured to compare the new incoming video frames to the reference images to determine where the object 252 is located using computer vision operations and/or 3D reconstruction. The reference images may enable 3D reconstruction to be performed when the monocular lens 160 is implemented. While one reference location 254 is shown in the scenario 250, the processor 102 may be configured to capture multiple reference images of various reference locations at different distances to have a basis for comparison of the structured light pattern SLP. The number of the reference images stored and/or the various distances for the reference location may be varied according to the design criteria of a particular implementation.

A line 260 is shown. The line 260 may represent a baseline depth of the camera device 100 from the object 252. The line 260 may illustrate a depth direction. The CNN module 190*b* of the processor 102 may be configured to arrange reference images along the depth direction 260 shown. A line 262 is shown. The line 262 may represent the structured light pattern SLP generated by the structured light projector 106. The structured light pattern SLP is shown as the line 262 being projected onto the object 252. A line 264 is shown. The line 264 may represent the structured light pattern SLP captured by the image sensor 180 with respect to the object 252 and a depth direction of the object 252. A line 266 is shown. The line 266 may represent the structured light pattern SLP and generated by the structured light pattern for the reference image. The structured light pattern SLP is shown as the line 266 being projected onto the reference location 254 (e.g., captured when the object 252 is not present). For example, instead of being projected onto the object 252, when the object 252 is not present, the structured light pattern SLP may project beyond the distance DO and onto the reference location 254. A line 268 is shown. The light 268 may represent the structured light pattern SLP captured by the image sensor 180 with respect to the reference location 254 and a depth direction of the reference location 254.

When the object 252 is present, the structured light pattern SLP may be projected onto the object 252 (e.g., the line 262) and the image sensor 180 may capture the object 252 with the structured light pattern SLP (e.g., the line 264). The line 264 may illustrate that the structured light pattern SLP projected onto the object 252 may enter the lens 160 and be captured by the image sensor 180 at a location A. When the object 252 is not present, the structured light pattern SLP may be projected onto the reference location 254 (e.g., the line 266) and the image sensor 180 may capture the reference location 254 with the structured light pattern SLP (e.g., the line 268). The line 268 may illustrate that the structured light pattern SLP projected onto the reference location 254 may enter the lens 160 and be captured by the image sensor 180 at a location B.

A distance D is shown on the image sensor 180. The distance D may represent a distance between the location A (e.g., where the structured light pattern SLP was captured for the object 252) and the location B (e.g., where the structured light pattern SLP was captured for the reference location 254). The distance D may represent a disparity between the structured light pattern SLP for the distance DO of the object 252 and the distance DR for the reference location 254. The disparity amount D may be used by the processor 102 and/or the CNN module 190*b* to determine a depth estimation of the object 252 using a monocular structured light pattern.

Figure 6:
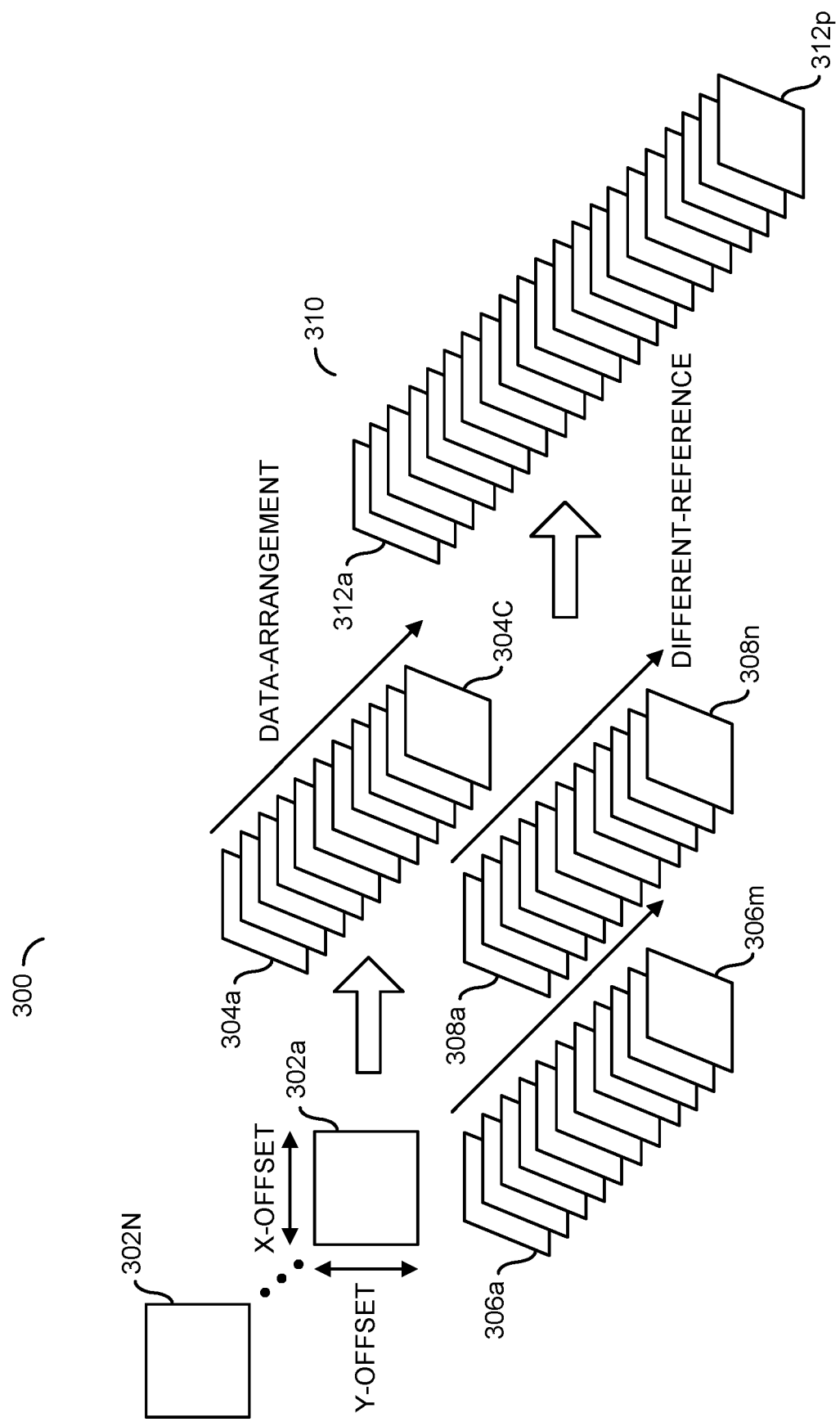
FIG. 6 is a diagram illustrating data arrangement of a four-dimensional tensor of reference images.

Referring to FIG. 6, a diagram illustrating data arrangement of a four-dimensional tensor of reference images is shown. A data arrangement 300 is shown. The processor 102 may be configured to perform the data arrangement 300 in order to implement a monocular structured light block matching technique based on horizontal and vertical separation convolution and hole convolution. The monocular structured light block matching technique may be implemented in order to perform 3D reconstruction locally on the processor 102 (e.g., perform all the processing on the edge device 100 without uploading data to cloud computing resources to perform the analysis).

The processor 102 and/or the CNN module 190*b* may be configured to perform preprocessing on reference video frames and input video frames. The preprocessing may be performed before the block matching techniques. The preprocessing may be implemented to improve the accuracy of the back-end matching, reduce the generation of error points and/or separate the speckle pattern from the background image. In one example, the preprocessing may be performed by generating a local adaptive binary expression with an adaptive offset term using convolution techniques. Similar to the block matching techniques based on horizontal and vertical separation convolution and hole convolution, the preprocessing may also be performed by utilizing the local dedicated hardware modules 204*a*-204*n* for implementing convolutional neural networks implemented by the processor 102 and/or the CNN module 190*b*. Details of the preprocessing performed may be described in association with co-pending U.S. application Ser. No. 17/412,715, filed on Aug. 26, 2021, appropriate portions of which are incorporated by reference.

The data arrangement 300 may be performed by the processor 102 and/or the CNN module 190*b*. The data arrangement 300 may be performed offline (e.g., during offline training). In an example, the reference images may be acquired and preprocessed before the pixel data for the input video images are generated by the capture device 104 and arranged as video frames by the processor 102. The processor 102 and/or the CNN module 190*b* may be configured to arrange the reference image data of monocular structured light obtained after collection of the reference images and preprocessing.

In the data arrangement 300, reference images 302*a*-302N are shown. To perform the data arrangement 300, the CNN module 190*b* may be configured to perform a vertical shift and a horizontal shift in the of the reference images 302*a*-302N (e.g., a Y-offset and an X-offset). The dedicated hardware modules 204*a*-204*n* may be configured to shift the reference image 302*a* pixel-by-pixel in the X and Y direction of the image coordinates. For example, the horizontal shift (e.g., shift along the X axis of the reference image 302*a*) and vertical shift (e.g., shift along the Y axis of the reference image 302*a*) may be performed according to prior conditions of the horizontal and vertical shift of the structured light pattern SLP in a depth direction from the camera device 102. The reference image 302*a* may be shifted in the X direction by m pixels. The reference image 302*a* may shifted in the Y direction by n pixels. In some embodiments, the dedicated hardware modules 204*a*-204*n* may be configured to perform the shift operations in parallel (e.g., all of the reference images 302*a*-302N at the same time or groups of the references images 302*a*-302N at the same time). In some embodiments, the dedicated hardware modules 204*a*-204*n* may be configured to perform the shift operations on the reference images 302*a*-302N sequentially.

The processor 102 and/or the CNN module 190*b* may be configured to generate offset images 304*a*-304C from the reference image 302*a*. The offset images 304*a*-304C may comprise a number (e.g., C) of offset images in response to shifting the reference image 302*a* pixel-by-pixel in the X and Y directions.

Shifted reference images 306*a*-306*m* are shown. The shifted reference images 306*a*-306*m* may represent the reference frame 302*a* shifted in the X direction for each of the m number of pixels. For each shift in the X direction, one of the shifted reference images 306*a*-306*m* may be generated.

Shifted reference images 308*a*-308*n* are shown. The shifted reference images 308*a*-308*n* may represent the reference frame 302*a* shifted in the Y direction for each of the n number of pixels. For each shift in the Y direction, one of the shifted reference images 308*a*-308*n* may be generated.

By shifting the pixels of the reference images 302*a*-302N in the X direction, the processor 102 and/or the CNN module 190*b* may generate the shifted reference images 306*a*-306*m*.

By shifting the pixels of the reference image 302a-302N in the Y direction, the processor 102 and/or the CNN module 190b may generate the reference images 308a-308n. A depth of the offset images 304a-304C may be C. The depth value C may be based on them number of the shifted reference images 306a-306m in the X direction and the n number of the shifted reference images 308a-308n in the Y direction (e.g., C=m×n). The shifted reference images 306a-306m and the shifted reference images 308a-308n may be used to generate a tensor of the offset images 304a-304C. For example, a tensor of depth C may be generated for the reference image 302a.

While the reference image 302a is shown as a representative example, the processor 102 and/or the CNN module 190b may be configured to preprocess multiple reference images. For example, the processor 102 and/or the CNN module 190b may preprocess N number of reference images (e.g., 302a-302N). By performing the pixel-by-pixel shift in the X and Y direction for each of the reference images 302a-302N, each of the reference images 302a-302N may be used to generate C offset images 304a-304C.

A four-dimensional tensor of reference images 310 is shown. The data arrangement 300 may be implemented to generate the four-dimensional tensor of reference images 310. The four-dimensional tensor of reference images 310 may comprise a dimension P, a dimension D, a dimension H and a dimension W. The four-dimensional tensor of reference images 310 may be defined as P×D×H×W. The dimension W may be a width of each of the reference images 302a-302N. The dimension H may be a height of each of the reference images 302a-302N. The dimension D may be a depth of the offset images (e.g., the total number of offset images 304a-304C generated for each of the reference images 302a-302N). The dimension P may be a total number of the reference images at different distances. For example, the dimension P may be equal to the N number of the reference images 302a-302N.

The data arrangement 300 may comprise the processor 102 and/or the CNN module 190b putting the C offset images generated from the N reference images (e.g., the offset images 304a-304C generated from each of the reference images 302a-302N) into the P dimension of the four-dimensional tensor of reference images 310. The data arrangement 300 may comprise sorting the offset images 304a-304C from the N reference images based on the amount of disparity determined. For example, the offset images 304a-304C may be sorted from a minimum amount of disparity to a maximum amount of disparity.

The four-dimensional tensor of reference images 310 may comprise combined offset images 312a-312p. The combined offset images 312a-312p may comprise the C offset images 304a-304C generated from each of the N reference images 302a-302N. The reference images 302a-302N may comprise reference images of the structured light pattern corresponding to different distances from the camera device 100. In an example, the reference image 302a may comprise an image of the structured light pattern SLP that corresponds to the reference location 254 shown in association with FIG. 5. In another example, the reference image 302b may comprise an image of the structured light pattern SLP that corresponds to a reference location that may be closer to or farther from the reference location 254. In yet another example, the reference image 302c may comprise an image of the structured light pattern SLP at a reference location that is different than the reference location 254 of the reference image 302a and the reference location of the reference image 302b. The number of reference images 302a-302N that may be captured and preprocessed by the camera device 100 and/or the various distances of the structured light pattern SLP for each of the reference images 302a-302N may be varied according to the design criteria of a particular implementation.

Each of the reference images 302a-302N may pass through a padding boundary and keep the width and height to be w×h. The offset images 304a-304C generated from each of the reference images 302a-302N for different distances of the monocular structured light SLP may be arranged into the four-dimensional tensor of reference images 310. The data arrangement 300 of the four-dimensional tensor of reference images 310 may be configured to pre-configure the combined offset images 312a-312p in a format that may be operated on by the hardware modules 204a-204n. The data arrangement 300 may enable the four-dimensional tensor of reference images 310 to be pre-configured for parallelization of calculations. The parallelization of calculations may enable subsequently generated data to be performed efficiently using the convolution operations implemented by the CNN module 190b.

The combined offset images 312a-312p may be arranged in the four-dimensional tensor of reference images 310 based on a disparity value in the depth direction. In an example, the reference images 302a-302N may be shifted to create the shifted reference images 306a-306m and the shifted reference images 308a-308n (e.g., the offset images 304a-304C). The CNN module 190b may then arrange the shifted images (e.g., the offset images 304a-304C) in the depth direction of the four-dimensional tensor of reference images 310 according to the amount of disparity from the minimum disparity to the maximum disparity. For example, the combined offset image 312a may have minimum disparity in the depth direction 260 and the combined offset image 312p may have a maximum disparity in the depth direction 260. In one example, for the first combined offset image 312a, all the disparity values may be zeroes, the next combined offset image 312b may have all the disparity values as ones, etc. By arranging the combined offset images 312a-312p by the maximum (or minimum) cost value may be obtained for locating the best cost to determine the disparity in the same arrangement order (e.g., for a feature map tensor and/or for the lookup data each having a similar data arrangement).

Figure 9:
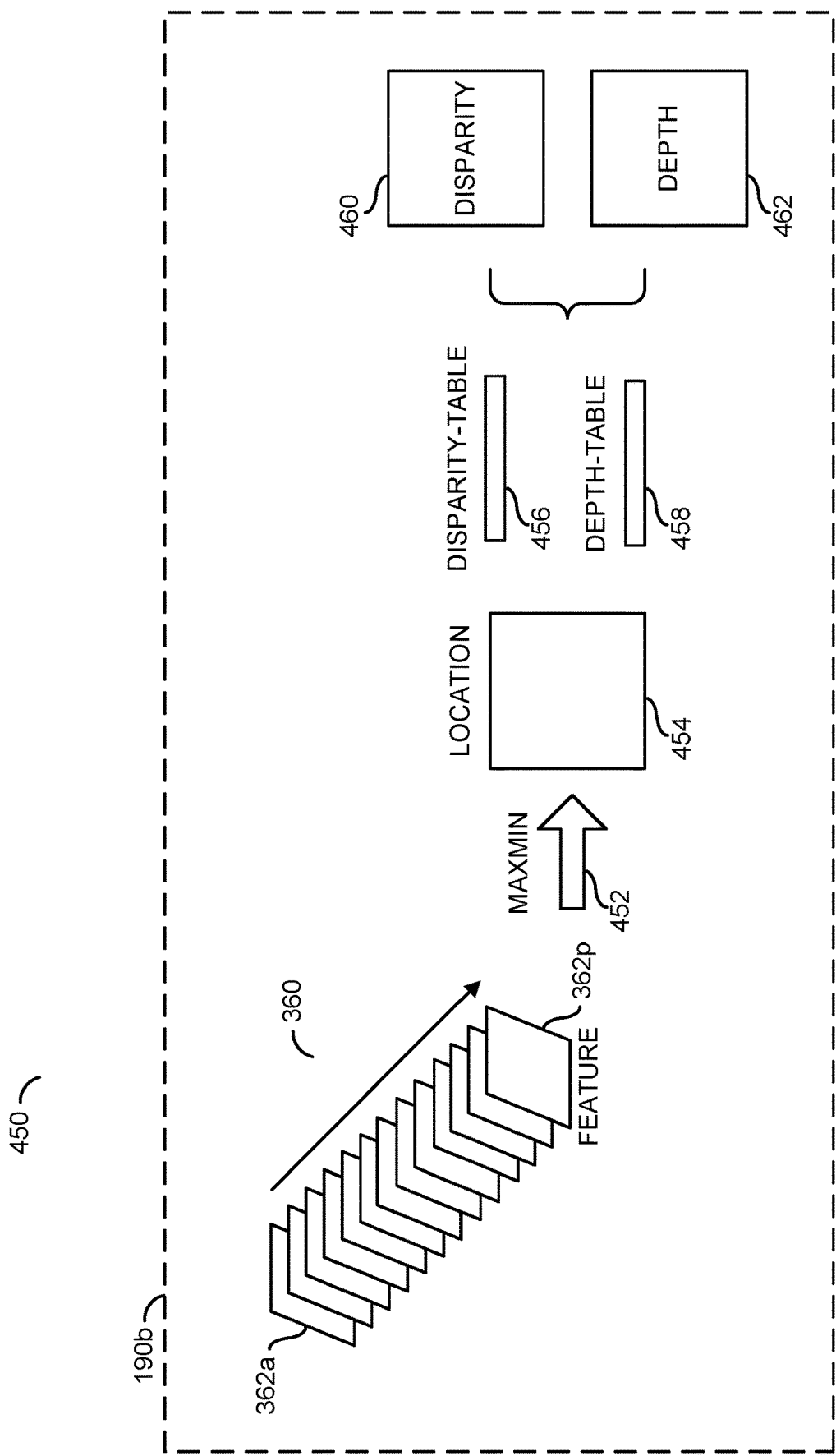
FIG. 9 is a diagram illustrating generating a disparity map and a depth map based on operations performed in the depth direction of a tensor of feature maps.

The lookup data (e.g., the disparity lookup table and the depth lookup table to be described in association with FIG. 9) may be arranged in the same arrangement order (and cost volume) as the four-dimensional tensor of reference images 310 (e.g., 0-63). Arranging the depth and disparity lookup tables in the same arrangement order may enable finding the disparity and depth of input video frames using a best cost index because all the pixels of each image in the depth direction may have the same disparity and/or depth. The generation of the lookup data may be performed offline with the arrangement of the data for the four-dimensional tensor of reference images 310.

Figure 7:
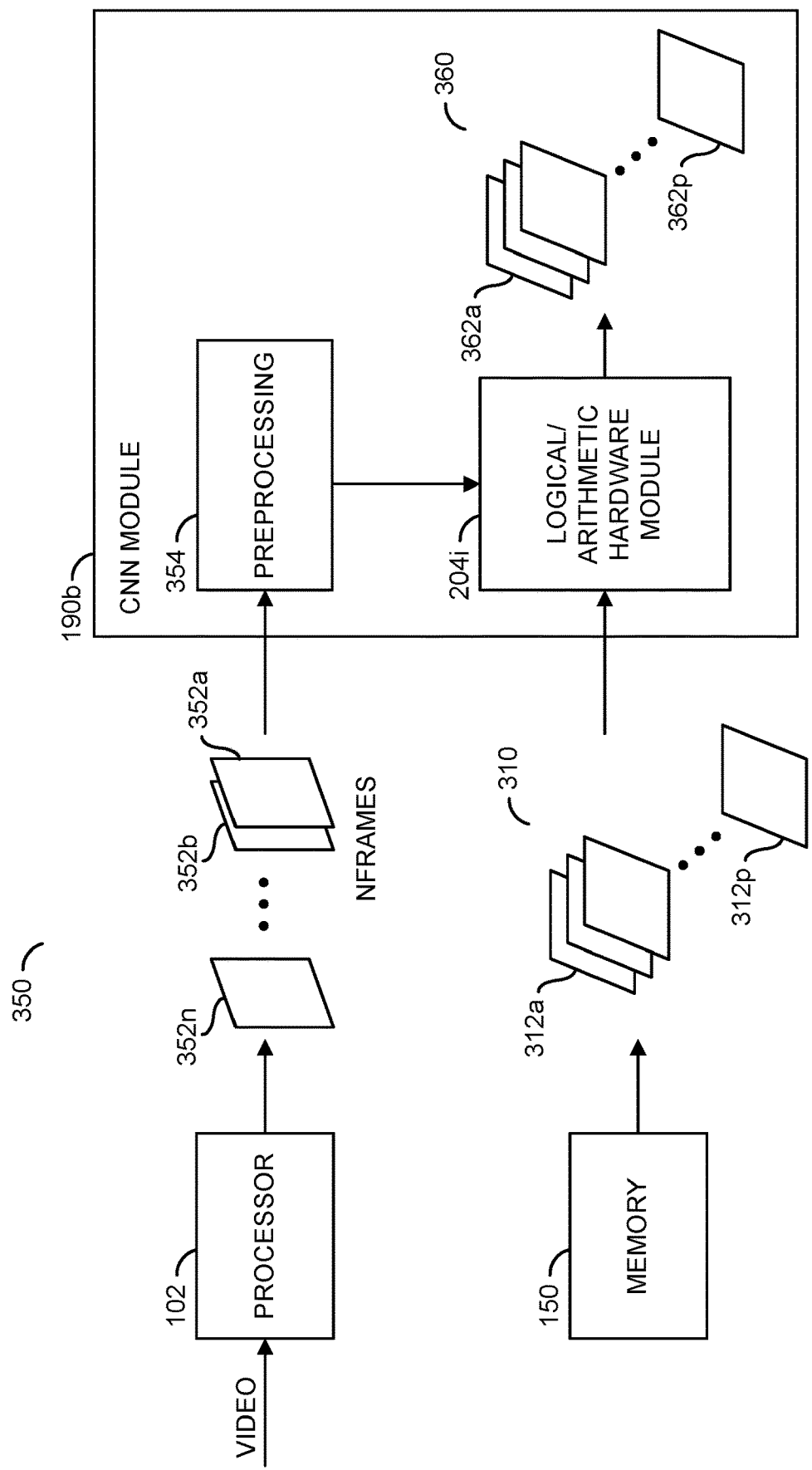
FIG. 7 is a diagram illustrating generating a feature map tensor in response to logical operations performed on reference video frames and input video frames.

Referring to FIG. 7, a diagram illustrating generating a feature map tensor in response to logical operations performed on reference video frames and input video frames is shown. A visualization 350 is shown. The visualization 350 may comprise the processor 102, the memory 150 and the CNN module 190b. Portions of the visualization 350 may comprise operations and/or communication of data internal to the processor 102. Portions of the visualization 350 may comprise operations and/or communication of data to the processor 102. Portions of the visualization 350 may comprise convolution operations performed by the convolutional neural network hardware implemented by the processor 102.

The processor 102 (e.g., the video processing pipeline of the processor 102) may be configured to receive the signal VIDEO. The signal VIDEO may comprise pixel data generated by the capture device 104. The processor 102 may generate a signal (e.g., NFRAMES). The signal NFRAMES may comprise input video frames 352a-352n (e.g., source video frames). The input video frames 352a-352n may comprise pixel data arranged as video frames. The input video frames 352a-352n may comprise images captured dynamically online. The input video frames 352a-352n may be presented to the CNN module 190b. The transfer of the input video frame 352a-352n may comprise a transfer of data internal to the processor 102. For example, the video processing pipeline of the processor 102 may generate the video frames 352a-352n and present the video frames 352a-352n to the CNN module 190b of the processor 102.

The four-dimensional tensor of reference images 310 may be stored by the memory 150. In an example, the processor 102 and/or the CNN module 190b may perform the preprocessing and/or the data arrangement 300 (as shown in association with FIG. 6) to generate the four-dimensional tensor of reference images 310 and the four-dimensional tensor of reference images 310 may be stored in the memory 150. In response to the processor 102 generating the input video frames 352a-352n, the memory 150 may present the combined offset images 312a-312p arranged into the four-dimensional tensor of reference images 310 to the CNN module 190b.

The processor 102 and/or the CNN module 190b may be configured to perform preprocessing on the input video frames 352a-352n. The preprocessing may be performed before the block matching techniques. The preprocessing may be configured to improve the accuracy of the back-end matching, reduce the generation of error points and/or separate the speckle pattern from the background image. The preprocessing performed on the input video frames 352a-352n may be similar to the preprocessing performed on the reference images 302a-302N.

The CNN module 190b may implement a block (or circuit) 354 and a logical and/or arithmetic hardware module 204i. The block 354 may implement preprocessing. The preprocessing block 354 may be implemented using one or more of the hardware modules 204a-204n. The input video frames NFRAMES may be received by the preprocessing block 354. The preprocessing block 354 may perform the preprocessing on the input video frames NFRAMES. The preprocessing block 354 may present the preprocessed video frames to the logical and/or arithmetic hardware module 204i. In some embodiments, the preprocessing block 354 may be further configured to perform the preprocessing on the reference images 302a-302N before the data arrangement 300 is performed on the reference images 302a-302N.

The logical and/or arithmetic hardware module 204i may comprise one or more of the hardware modules 204a-204n. The logical and/or arithmetic hardware module 204i may receive the input video frames 352a-352n and the four-dimensional tensor of reference images 310. The logical and/or arithmetic hardware module 204i may be configured to generate a tensor 360 in response to the input video frames 352a-352n and the four-dimensional tensor of reference images 310.

The tensor 360 may comprise a tensor of features maps. The tensor of feature maps 360 may comprise a four-dimensional tensor of the same size as the four-dimensional tensor of reference images 310. The tensor of feature maps 360 may comprise feature maps 362a-362p. The feature maps 362a-362p may be generated based on the input video frames 352a-352n.

The logical and/or arithmetic hardware module 204i may be configured to perform arithmetic or logical operations on each of the single-frame source video frames 352a-352n in the depth direction of the four-dimensional tensor of reference images 310. The arithmetic and/or logical operations may be performed channel by channel between the input video frames 352a-352n and each of the combined offset images 312a-312p. The input video frames 352a-352n may be preprocessed to be the same size as the combined offset images 312a-312p. The data arrangement 300 used to generate the four-dimensional tensor of reference images 310 may enable parallel computing operations. The parallel computing operations may enable the tensor of feature maps 360 to be generated efficiently (e.g., reducing a total number of calculations, reduce power consumption, reducing an amount of time to generate the tensor of feature maps 360 compared to similar calculations performed without first performing the data arrangement 300). For example, the data arrangement 300 may enable the tensor of feature maps 360 to be quickly obtained as a four-dimensional tensor having a cost space of the same size as the four-dimensional tensor of reference images 310.

The input video frame 352a-352n may comprise single-frame source images (e.g., the original IR image frame). The processor 102 and/or the CNN module 190b may preprocess the input video frames 352a-352n and the reference images 302a-302N (e.g., to generate the four-dimensional tensor of reference images 310). In one example, the arithmetic or logical operations may be performed on one of the single-frame source images 352a-352n as the preprocessing. The feature maps 362a-362p may be generated by logical and/or arithmetic hardware module 204i. In one example, the logical and/or arithmetic hardware module 204i may perform an XOR operation between the combined offset images 312a-312p arranged as the four-dimensional tensor of reference images 310 and the input video frames 352a-352n (e.g., video data with the structured light pattern SLP) in order to generate the feature maps 362a-362p.

The tensor of feature maps 360 generated in response to the XOR operation may be the same size as the four-dimensional tensor of reference images 310. For example, the tensor of feature maps 360 may comprise a four-dimensional tensor with the size P×D×H×W. The tensor of feature maps 360 may be the same size as the four-dimensional tensor of reference images 310 because the cost calculation performed by the logical and/or arithmetic hardware module 204i may be element by element to generate the feature maps 362a-362p. The feature maps 362a-362p may enable cost aggregation in the subsequent operations performed by the processor 102 and/or the CNN module 190b. In an example, the subsequent operations may comprise convolution operations. Generating the feature maps 362a-362p arranged as the tensor of feature maps 360 in response to the input video frames 352a-352n and the data arrangement 300 of the four-dimensional tensor of reference images 310 may improve the performance of the block matching techniques used by the processor 102 to generate disparity images and/or depth images.

Figure 8:
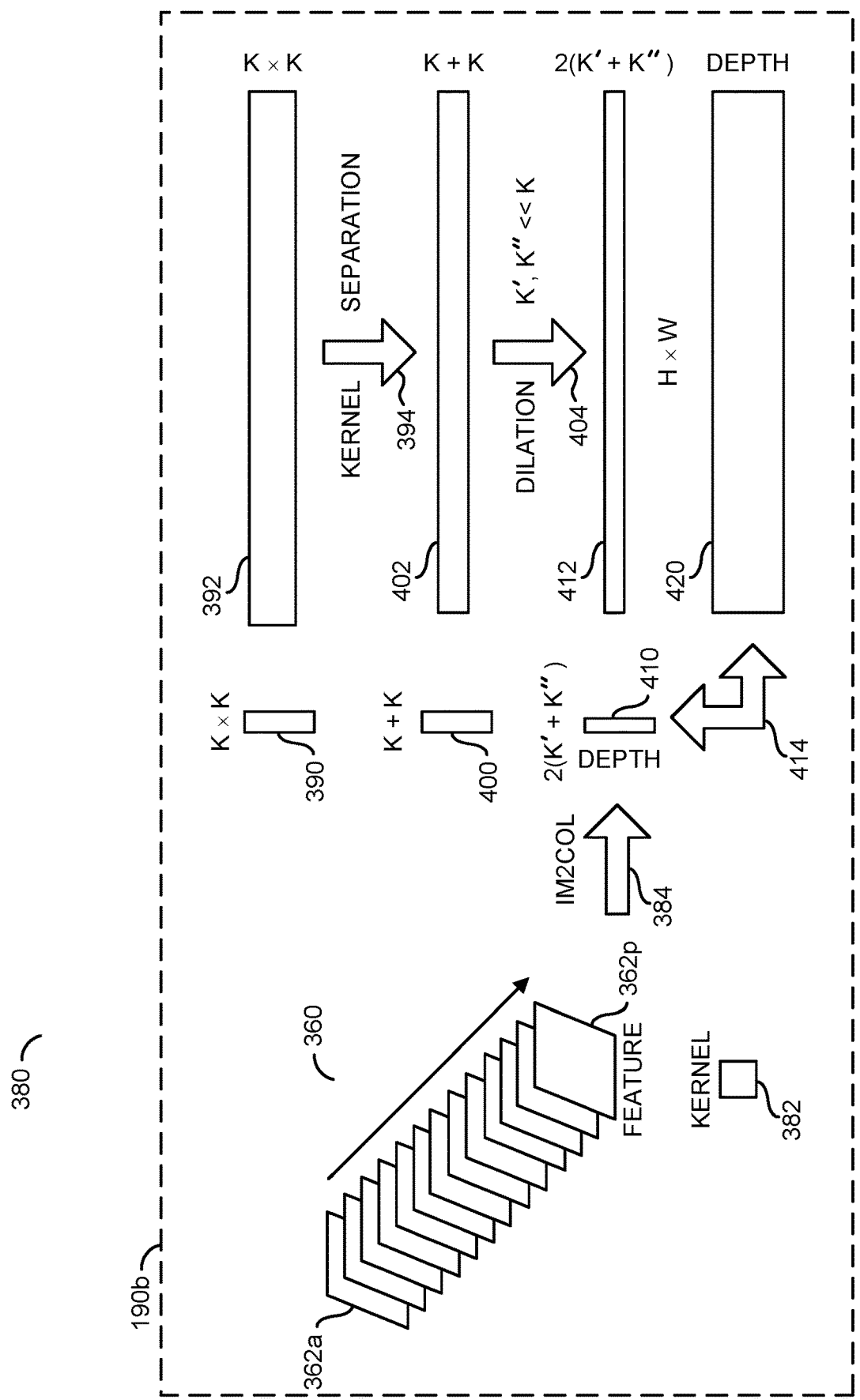
FIG. 8 is a diagram illustrating a horizontal and vertical separation convolution configured to reduce an amount of calculations performed to implement convolution filtering of a feature map tensor.

Referring to FIG. 8, a diagram illustrating a horizontal and vertical separation convolution configured to reduce an amount of calculations performed to implement convolution filtering of a feature map tensor is shown. A visualization 380 is shown. The visualization 380 may comprise the CNN module 190b. In an example, the visualization 380 may provide an illustrative example of operations performed by the CNN module 190b and/or the hardware modules 204a-204n. The visualization 380 may comprise convolutional operations performed by the CNN module 190b that may use a horizontal and vertical separation convolution and/or dilation to reduce an amount of calculations performed to implement convolution filtering (e.g., the convolution operator) for the tensor of feature maps 360. Portions of the visualization 380 may comprise convolution operations performed by the convolutional neural network hardware implemented by the processor 102.

The tensor of feature maps 360 is shown in the CNN module 190b. The feature maps 362a-362p that make up the tensor of feature maps 360 may have been generated in response to the logical and/or arithmetic operations performed by the CNN module 190b as shown in association with FIG. 7. A convolution kernel 382 is shown. The convolution kernel 382 may comprise a matrix of weight values that may be multiplied with the feature maps 362a-362p in order to extract relevant features. For example, the convolution kernel 382 may comprise a matrix that may be slid across the feature maps 362a-362p to perform repeated multiplication operations. In some embodiments, the convolution kernel 382 may implement a filter. The convolution kernel 382 may be used to perform the convolution filtering. In one example, the convolution kernel 382 may be a large-sized two-dimensional kernel. The size and/or type of the convolution kernel 382 may be varied according to the design criteria of a particular implementation.

The CNN module 190b may be configured to perform convolutional filtering operations one by one on the feature maps 362a-362p in the depth direction of the four-dimensional tensor of feature maps 360. Performing the convolutional filtering operations in the depth direction of the four-dimensional tensor of feature maps 360 may aggregate the cost of the operations. The CNN module 190b may be configured to perform additional operations and/or data arrangements to improve calculation speed.

In one example, the convolution kernel 382 may have a size of 17×17 or greater. For example, a kernel size of 17 or larger may not be supported by the processor 102 (e.g., the processor 102 may support a maximum kernel size of 11). In another example, a large kernel size may take more time to perform the convolution operations than a smaller kernel size (e.g., for VGA data may need to be generated within 400 ms). The CNN module 190b may be configured to reduce a size of the convolution kernel 382. The cost aggregation value may be a sum of kernel size windows by convolution. If the size of the convolution kernel 382 is large and costs too much time to sum directly, the CNN module 190b may be configured to reduce the size of the convolution kernel 382 to accelerate the process. Reducing the size of the convolution kernel 382 may reduce the cost aggregation to the cost volume, in order to find the best cost in the depth direction for determining disparity.

An operation 384 is shown. The operation 384 may comprise an IM2COL operation. The IM2COL operation may be one method of accelerating the convolution operations. The IM2COL operation may comprise one example convolution operator implemented by the hardware modules 204a-204n. The IM2COL operation 384 may be configured to rearrange discrete image blocks of size m×n into columns and return the concatenated columns in a matrix. The IM2COL operation may be configured to pad the feature maps 362a-362p, if necessary. The IM2COL operation 384 may be configured to arrange the data of the feature maps 362a-362p in a way that the convolution output may be achieved by matrix multiplication, which may reduce computational complexity. In an example, the IM2COL operation 384 may be configured to arrange matrices to enable accesses to be contiguous and/or enable hardware features such as spatial locality caching and prefetching in order to reduce calculation time and/or to enable the CNN module 190b to parallelize operations. The IM2COL operation 384 may be implemented by one or more of the hardware modules 204a-204n. The IM2COL operation 384 may be configured to operate on each channel of the four-dimensional tensor of feature maps 360 in parallel.

In order to further improve the calculation speed of the convolution operations, the CNN module 190b may be configured to reduce the large amount of calculations generally required by the large-size convolution kernel 382. The convolution kernel 382 may be separable. The CNN module 190b may be configured to separate the convolution kernel 382 into a cascade of two one-dimensional convolution kernels.

A kernel 390 is shown. The matrix 390 may illustrate the convolution kernel 382 as a K×K size matrix. A body size 392 of the tensor is shown. In an example, the kernel 390 may comprise the two-dimensional convolutional kernel 382 with a size of K×K (e.g., 17×17). An operation 394 is shown. The operation 394 may be a separation operation. The separation operation 394 may illustrate a derivation process that may be configured to generate the two one-dimensional convolution kernels from a two-dimensional convolution kernel.

A kernel 400 is shown. The kernel 400 may represent the two one-dimensional convolution kernels separated from the convolution kernel 382. In an example, the kernel 400 may comprise a one-dimensional convolution kernel in the X-axis direction of the feature maps 362a-362p and a one-dimensional convolution kernel in the Y-axis direction of the feature maps 362a-362p. A body size 402 of the tensor is shown. The body size 402 is shown having a smaller size than the body size 392 of the tensor before the separation operation 394.

The one-dimensional convolution kernel in the X-direction and the one-dimensional convolution kernel in the Y-direction may each be large-sized one-dimensional convolution kernels (e.g., the cascade of one-dimensional convolution kernels 400). The separation operation 394 may reduce an amount of computation needed from K×K to 2K (e.g., K+K). In an example, the convolution kernel 382 may be a 2D convolution kernel with a size of 17×17. The separation operation 394 may reduce the convolution kernel 382 into a cascade of two 1D convolution kernels 400. The two 1D convolution kernels 400 may have a size of 17×1 and 1×17 (e.g., in the horizontal and vertical directions respectively). In an example, constraints of the processor 102 may still not be able to support the 1×17 or the 17×1 convolution kernels. The CNN module 190b may be configured to further reduce the size of 1D large size kernel 400 to a small enough size to be supported by the processor 102. The two 1D convolution kernels 400 may be decomposed into two 1D dilated convolution kernels. The dilated kernels may provide time saving and/or computational efficiency because of zeros present in a dilated convolution kernel (e.g., resulting in no calculation).

The CNN module 190b may be configured to decompose each of the large-size one-dimensional convolution kernels into a small-sized one-dimensional convolution kernel and a small-sized one-dimensional hollow convolution kernel. An operation 404 is shown. The operation 404 may comprise a dilation operation (e.g., a hollow convolution, a cavity convolution, etc.). The dilation operation 404 may be performed by the CNN module 190b on the cascade of one-dimensional convolution kernels 400.

A kernel 410 and a body size 412 of the tensor are shown. The kernel 410 may comprise four one-dimensional small-sized kernels decomposed from the cascade of two large-size one-dimensional convolution kernels 400 (e.g., an x-axis one-dimensional hollow kernel, an x-axis one-dimensional convolution kernel, a y-axis one-dimensional hollow kernel and a y=axis one-dimensional convolution kernel). The body size 412 is shown having a smaller size than the body size 402 of the tensor before the dilation operation 404. The dilation operation 404 may reduce an amount of computation needed from 2K (e.g., K+K) to 2×(K'+K"), where K'+K" may represent the number of operations for two of the small-sized one-dimensional convolutional kernels. The amount of computations for K' and K" may be much less than the amount of computations for K.

An operation 414 is shown. The operation 414 may comprise a cost aggregation operation implemented by the CNN module 190b. The cost aggregation operation 414 may be configured to determine the cost aggregation value for the feature maps 362a-362p of the feature map tensor 360 after the convolution operation. A cost aggregation value 420 is shown. The cost aggregation value 420 may be determined in the X-axis direction or the Y-axis direction through the four small-size convolutions. The cost after aggregation value 420 may comprise a four-dimensional tensor of the same size of the tensor of feature maps 360 (and the four-dimensional tensor of reference images 310). The cost aggregation value 420 may need to have the image boundary filled. The size of cost aggregation may be pitch×depth×height×width.

The CNN module 190b may be configured to perform the convolution filtering operation on the feature maps 362a-362p in the tensor of feature maps 360 for cost calculation. The CNN module 190b may be configured to implement a separable hole convolution. The CNN module 190b may implement dimensionality reduction of large-size convolution kernel 382. Reducing the dimensionality may reduce the number of repetitive calculations of convolution operations, which may increase performance (e.g., reduce power consumption, reduce the amount of time to generate results, etc.).

Referring to FIG. 9, a diagram illustrating generating a disparity map and a depth map based on operations performed in the depth direction of a tensor of feature maps is shown. A visualization 450 is shown. The visualization 450 may comprise the CNN module 190b. In an example, the visualization 450 may provide an illustrative example of operations performed by the CNN module 190b and/or the hardware modules 204a-204n. The visualization 450 may comprise convolutional operations performed by the CNN module 190b that may generate disparity maps and depth maps in response to the tensor of feature maps 360. Portions of the visualization 450 may comprise convolution operations performed by the convolutional neural network hardware implemented by the processor 102.

An operation 452 is shown. The operation 452 may comprise one of the convolutional filtering operations performed by the CNN module 190b. The operation 452 may comprise a MAXMIN operation. In an example, the MAXMIN operation 452 may comprise the minimum-maximum-reduction operator implemented by one or more of the hardware modules 204a-204n. The MAXMIN operation 452 may be configured to be performed on each of the feature maps 362a-362p of the tensor of feature maps 360. The MAXMIN operation 452 may be configured to return a location of a minimum and maximum value of matrices representing the feature maps 362a-362p.

A block 454 is shown. The block 454 may comprise an index map. The MAXMIN operation 452 may be performed in the depth direction of the four-dimensional tensor of feature maps 360. The MAXMIN operation 452 may be configured to perform a maximum value calculation in order to determine a depth dimension index value. The CNN module 190b may be configured to determine the depth dimension index value in response to the maximum value calculation performed by the MAXMIN operation 452 in the depth direction of the tensor of feature maps 360. The depth direction index value may be where the maximum value is located in the feature maps 362a-362p. Based on the depth dimension index value, the index map 454 with a width and height of w×h may be determined by the CNN module 190b.

The MAXMIN operation 452 may be configured to determine a position of the maximum value for every pixel in the input video frames 352a-352n (e.g., using the feature maps 362a-362p). The maximum value position data may be arranged as the index map 454. The index map 454 may have a width and height of w×h. For example, the index map 454 may be a W×H tensor for the index map locations.

Lookup data 456-458 is shown. The lookup data 456-458 may comprise one lookup table 456 and a separate lookup table 458. The lookup table 456 may be a disparity lookup table and the lookup table 458 may be a depth lookup table. The disparity lookup table 456 may be a one-dimensional table of values having an arrangement order that may be consistent with the depth dimension and/or depth direction of the four-dimensional tensor of feature maps 360 and the four-dimensional tensor of reference images 310. The depth lookup table 458 may be a one-dimensional table of values having an arrangement order that may be consistent with the depth dimension and/or depth direction of the four-dimensional tensor of feature maps 360 and the four-dimensional tensor of reference images 310. Both the disparity lookup table 456 and the depth lookup table 458 may be arranged in advance (e.g., prepared offline before the input video frames 352a-352n are generated). Both the disparity lookup table 456 and the depth lookup table 458 may have a size of 1×D (e.g., one-dimensional tables).

A block 460 and a block 462 are shown. The blocks 460-462 may be an output of the CNN module 190b and/or the processor 102. The block 460 may comprise a disparity map. The block 462 may be a depth map. The disparity map 460 and the depth map 462 may be an output presented in the signal DIMAGES. The disparity map 460 and the depth map 462 may be an output generated in response to feature maps 362a-362p of the four-dimensional tensor of feature maps 360.

The CNN module 190b may be configured to search the lookup data 456-458 based on the index map 454 to determine the disparity map 460 and the depth map 462. The disparity lookup table 456 and the depth lookup table 458 may be searched separately to generate the disparity map 460 and the depth map 462. The disparity map 460 and the depth map 462 may have a size corresponding to w×h (e.g., the size of the reference images 302a-302N and the size of the index map 454).

The disparity lookup table 456 and the depth lookup table 458 may each be prepared offline. Preparing the disparity lookup table 456 and the depth lookup table 458 offline may enable the lookup data 456-458 to be consistent with a sort order (e.g., the data arrangement 300) of the reference images in the four-dimensional tensor of reference images 310. The lookup data 456-458 may be implemented for performing disparity and depth calculations so that the maximum depth dimension index map 454 in the depth direction of the four-dimensional tensor of feature maps 360 may quickly pass through the disparity lookup table 456 and the depth lookup table 458 in order to generate the disparity map 460 and the depth map 462.

The disparity map 460 and the depth map 462 may be determined according to an optimal cost index position. For example, the CNN module 190b may find an index number of the minimum cost with a value of three in the depth direction (e.g., D channel), then the CNN module 190b may determine that the disparity position is three in the disparity lookup table 456 and the depth position is three in the depth lookup table 458.

The maximum value position for every pixel in the video frames 352a-352n may be determined and arranged into the index map 454 (e.g., a W×H tensor for the index map location). The CNN module 190b may use the index map location tensor 454 to search the disparity lookup table 456 to find every pixel disparity in order to generate the disparity map 460. The CNN module 190b may use the index map location tensor 454 to search the depth lookup table 458 to find the depth of every pixel in order to generate the depth map 462.

Figure 10:
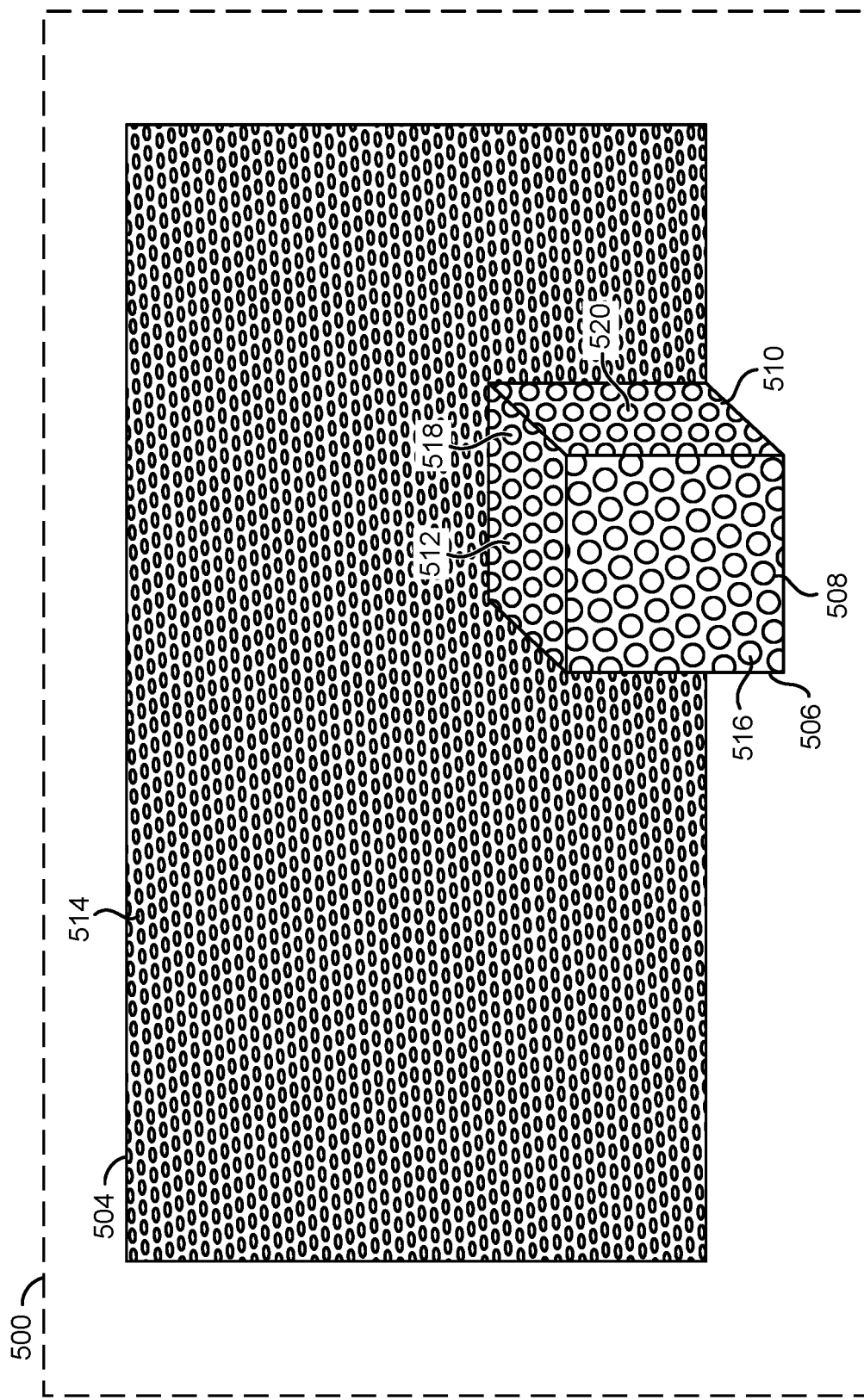
FIG. 10 is a diagram illustrating an example speckle image.

Referring to FIG. 10, a diagram illustrating an example speckle image is shown. A dotted box 500 is shown. The dotted box 500 may represent a video frame. The video frame 500 may be an example input video frame captured by the capture device 104. In an example, the video frame 500 may represent the signal VIDEO generated by the capture device 104 and presented to the processor 102. The video frame 500 may represent an example of a speckle image. In an example, the video frame 500 may be one of the reference images 302a-302N. The video frame 500 may capture the structured light pattern SLP generated by the structured light projector 106.

The video frame 500 may comprise a wall 504 and a box 506. The box 506 may have a front face 508, a side 510 and a top 512. The front face 508 of the box 506 may be generally facing a direction of the capture device 104 that captured the video frame 500. For example, the front face 508 may be a side of the box 506 with the closest distance to the capture device 104. In the example shown, the box 506 may not be directly facing the capture device 104. For example, the side 510 and the top 512 may be a distance that is farther away from the capture device 104 compared to the distance of the front face 508 to the capture device 104. The white wall 504 may be located farther away from the capture device 104 than the front face 508, the side 510 and/or the top 512 of the box 506.

Generally, in order to evaluate an accuracy of a depth-sensing system, a white wall may be used as an evaluation scene. The wall 504 may be the white wall for the evaluation scene. The box 506 may be located in front of the white wall 504. An accuracy of the depth and/or disparity of the white wall 504 and the box 506 may be determined. In an example, the depth map and/or the disparity map that is accurate may be more capable of distinguishing an accuracy of edges of the white wall 504 and/or the box 506 than a less accurate depth map and/or disparity map.

The structured light projector 106 may be configured to cast the structured light pattern SLP on the white wall 504 and the box 506. In one example, the structured light pattern SLP may be implemented as a speckle pattern comprising dots of a predetermined size. Generally, when the structured light pattern SLP is cast onto an object that is closer to the lens 160 of the capture device 104, the dots of the structured light pattern SLP may have a larger size than the dots of the structured light pattern SLP that have been cast onto an object that is farther away from the lens 160 of the capture device 104. For clarity and illustrative purposes to show differences in the speckle pattern on the white wall 504 and the box 506, the speckle pattern of dots for the structured light pattern SLP is only shown cast onto the white wall 504 and the box 506. Generally, the speckle pattern of dots for the structured light pattern SLP may be cast onto the entirety of the video frame 500 (e.g., on the floor/ground, on a ceiling, on any surfaces beside the white wall 504, etc.).

The speckle pattern of the structured light pattern SLP is shown as a pattern 514 on the white wall 504, a pattern 516 on the front face 508 of the box 506, a pattern 518 on the top 512 of the box 506 and a pattern 520 on the side 510 of the box 506. The dots of the pattern 514 may comprise small dots. The dots of the pattern 516 may comprise large dots. The dots of the pattern 518 and the dots of the pattern 520 may comprise medium-sized dots.

Since the front face 508 of the box 506 may be a closest surface to the lens 160, the pattern 516 may comprise dots with the largest size in the video frame 500. The side 510 and the top 512 of the box 506 may be farther away from the lens 160 than the front face 508, but closer to the lens 160 than the white wall 504. The dots of the pattern 518 on the top 512 and the dots of the pattern 520 on the side 510 may be smaller than the dots of the pattern 516 on the front face 508. Which of the dots of the pattern 518 or the dots of the pattern 520 are larger may depend on which surface (e.g., the side 510 or the top 512) is closer to the lens 160. Since the white wall 504 may be a surface the farthest away from the lens 160, the pattern 514 may comprise dots with the smallest size in the video frame 500.

The size of the dots in the patterns 514-520 of the structured light pattern SLP in the video frame 500 may be used by the processor 102 to determine a distance and/or depth of various objects captured in a video frame. The size of the dots in the patterns 514-520 may enable the processor 102 to generate the disparity map 460. The depth map 462 and/or the disparity map 460 may be generated in response to the video frames 352a-352n captured using the monocular lens 160 and an analysis performed on the speckle patterns 514-520.

In one example, the processor 102 may be configured to perform a downscale of a 1×1280×720 image directly from the DSP to 1×480×272. By implementing the video pipeline of the processor 102 with the neural network module 190b (e.g., using the convolution techniques to accelerate speckle image block matching), the amount of time to generate the disparity map 460 and the depth map 462 may be approximately 3.59 ms (e.g., with Net_id: 0, Dags: 1/1, vp_ticks: 44125, vp_time: 3587 us). Running the block matching on a general purpose processor (e.g., an ARM processor), the generation time for the depth map and disparity map (e.g., without convolution techniques) may be approximately 100 ms (e.g., arm time: 3619 us). The use of convolution performed using the hardware modules 204a-204n for convolution operations to accelerate the block matching techniques may provide a significant speed advantage compared to using a general purpose processor. The final disparity map 460 and the depth map 462 may also achieve more accurate results (e.g., fewer errors). For example, the convolution operator may enable filling the edge pattern information to avoid fuzzy edges.

A single point proportion of the video frame 500 may be determined by the processor 102. The single point proportion may be determined in response to calculating single point numbers divided all the point numbers. All the point numbers may comprise a sum of single point numbers, isolated points, connection points and glitch points) in one image after the preprocessing binarization. In an example, the single point proportion for the video frame 500 may be 95.4%.

Figure 11:
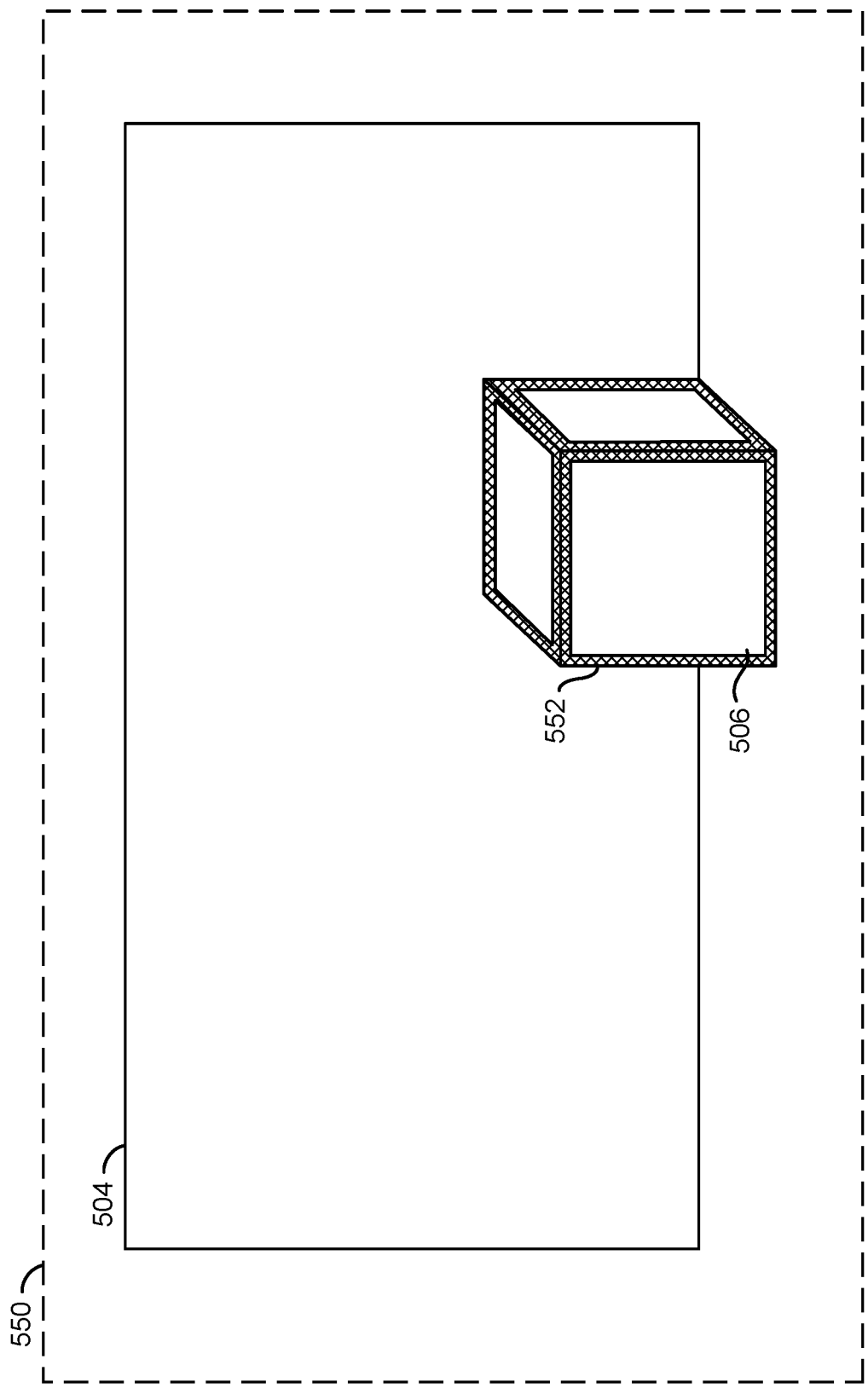
FIG. 11 is a diagram illustrating a disparity map generated from a speckle image without implementing accelerated speckle image block matching using the convolution techniques.

Referring to FIG. 11, a diagram illustrating a disparity map generated from a speckle image without implementing accelerated speckle image block matching using the convolution techniques is shown. A dotted box 550 is shown. The dotted box 550 may represent a disparity map. The disparity map 550 may be an example output generated by the processor 102 (e.g., the signal DIMAGES). In the example shown, the disparity map 550 may represent a disparity map generated without using the convolution techniques to generate the tensor of feature maps 360, the index map tensor 454 and/or the lookup data 456-458. For example, the processor 102 may be configured to generate the signal DIMAGES by using the neural network operations described in association with FIGS. 5-9 (e.g., high accuracy, efficient operations, lower power consumption) or without using the neural network operations described in association with FIGS. 5-9 (e.g., less accurate, less efficient operations, more power consumption).

The white wall 504 and the box 506 are shown in the disparity map 550. The white wall 504 and the box 506 are shown without the speckle patterns 514-520. For example, binarization operations performed by the processor 102 and/or the CNN module 190*b* may extract the speckle patterns 514-520 in order to enable the processor 102 to perform disparity calculations.

The box 506 is shown with edges 552. The edges 552 may have inaccuracies. In the example shown, the edges 552 are shown as generally fuzzy to illustrate the inaccuracies. The inaccuracies of the edges 552 may be present in the disparity map 550 because the data arrangement 300, the convolution operations and/or other neural network operations were not used (e.g., other methods may generate inaccuracies that may be corrected when using the neural network operations described in association with FIGS. 5-9).

A disparity error may be calculated for every pixel in a disparity map. In an example, a pixel may have a disparity error may be considered to have a disparity error if a disparity for a pixel is larger than 1 compared with a ground truth disparity. The ground truth disparity may be determined based on the real reference images 302*a*-302N. In an example, the processor 102 may be configured to perform a disparity error calculation.

The processor 102 may be further configured to calculate the proportion of disparity error for each pixel. The proportion of disparity error for each pixel may be determined by summing the total disparity error pixels and dividing the sum by the image size. The proportion of disparity error for each pixel may provide a measure of disparity quality for the disparity map 550. In the example shown, the proportion of disparity error for each pixel may be approximately 5.7%. The disparity error may result in the inaccuracies of the edges 552 in the disparity map 550.

Figure 12:
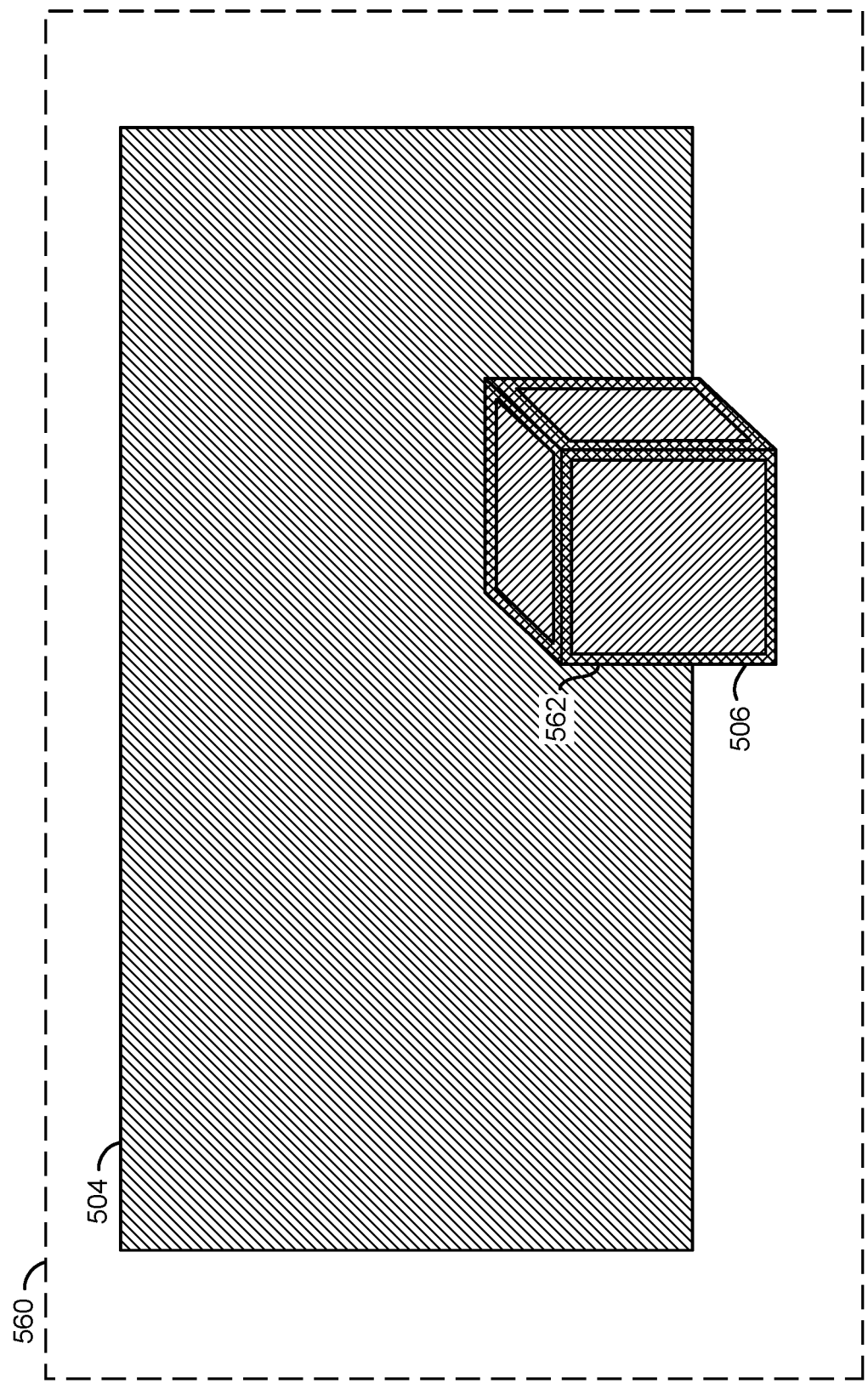
FIG. 12 is a diagram illustrating a depth map generated from a speckle image without implementing accelerated speckle image block matching using the convolution techniques.

Referring to FIG. 12, a diagram illustrating a depth map generated from a speckle image without implementing accelerated speckle image block matching using the convolution techniques is shown. A dotted box 560 is shown. The dotted box 560 may represent a depth map. The depth map 560 may be an example output generated by the processor 102 (e.g., the signal DIMAGES). In the example shown, the depth map 560 may represent a depth map generated without using the convolution techniques to generate the tensor of feature maps 360, the index map tensor 454 and/or the lookup data 456-458. For example, the processor 102 may be configured to generate the signal DIMAGES by using the neural network operations described in association with FIGS. 5-9 (e.g., high accuracy, efficient operations, lower power consumption) or without using the neural network operations described in association with FIGS. 5-9 (e.g., less accurate, less efficient operations, more power consumption).

The white wall 504 and the box 506 are shown in the depth map 560. The white wall 504 and the box 506 are shown without the speckle patterns 514-520. For example, the binarization implemented by the processor 102 and/or the CNN module 190*b* may extract the speckle patterns 514-520 in order to enable the processor 102 to perform depth calculations.

The box 506 is shown with edges 562. The edges 562 may have inaccuracies. In the example shown, the edges 562 are shown as generally fuzzy to illustrate the inaccuracies. The inaccuracies of the edges 562 may be present in the depth map 560 because the data arrangement 300, the convolution operations and/or other neural network operations were not used (e.g., other methods may generate inaccuracies that may be corrected when using the neural network operations 300-400 described in association with FIGS. 5-9).

A Z-accuracy may be calculated in order to evaluate depth data accuracy in a depth image. The Z-accuracy may measure how close depth values reported in the depth image are to a ground truth value. The ground truth values may be determined based on the real reference images 302*a*-302N. In an example, the processor 102 may be configured to perform a Z-accuracy calculation.

A fill rate may be calculated in order to measure a proportion of the depth image containing valid pixels. Valid pixels may be pixels with non-zero depth values. The fill rate metric may be independent of the accuracy of the depth data. The processor 102 may be configured to perform the fill rate calculation.

In the example shown, the Z-accuracy of the depth image 560 may be approximately 94.3%. In the example shown, the fill rate of the depth image 560 may be approximately 97.3%. The low Z-accuracy value and/or the low fill rate measured may result in the inaccuracies of the edges 562 in the depth map 560.

Figure 13:
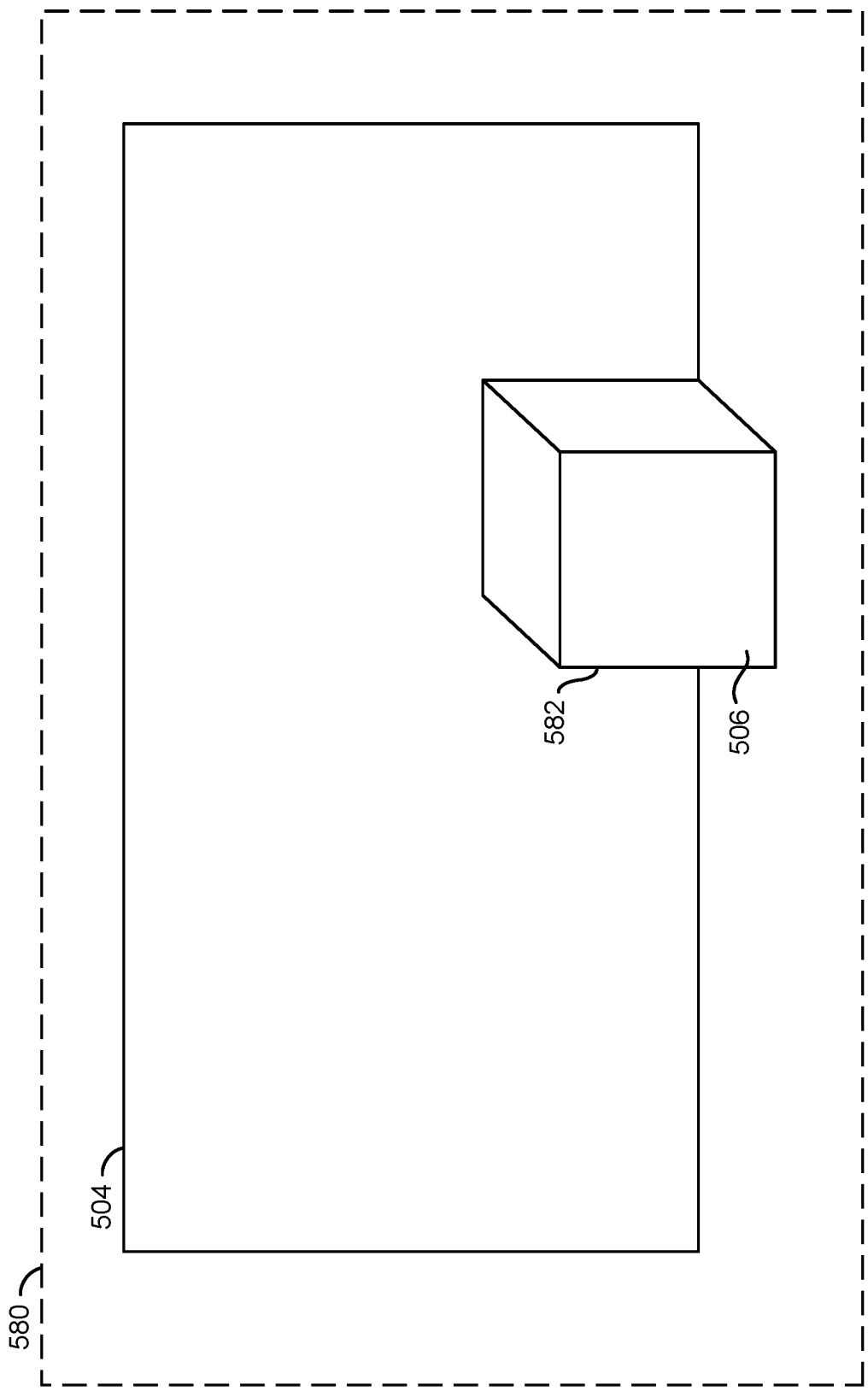
FIG. 13 is a diagram illustrating a disparity map generated from a speckle image in response to implementing accelerated speckle image block matching using the convolution techniques.

Referring to FIG. 13, a diagram illustrating a disparity map generated from a speckle image in response to implementing accelerated speckle image block matching using the convolution techniques is shown. A dotted box 580 is shown. The dotted box 580 may represent a disparity map. The disparity map 580 may be an example output generated by the processor 102 (e.g., the signal DIMAGES). In the example shown, the disparity map 580 may represent the disparity map 460 generated using the convolution techniques to generate the tensor of feature maps 360, the index map tensor 454 and/or the lookup data 456-458. For example, the processor 102 may be configured to generate the signal DIMAGES by using the neural network operations described in association with FIGS. 5-9.

The disparity map 580 may represent a result generated by the processor 102 after the data arrangement 300, using the convolution techniques to generate the tensor of feature maps 360, the index map tensor 454 and/or the lookup data 456-458. The hardware accelerated convolution operations may be used to generate the disparity map 580. In an example, one or more of the hardware modules 190*a*-190*n* implemented by the processor 102 may be configured to perform block matching operations using the data arrangement 300 of the four-dimensional tensor 310 with the video frames 352a-352n as input in order to generate the disparity map 580.

The white wall 504 and the box 506 are shown in the disparity map 580. The white wall 504 and the box 506 are shown without the speckle patterns 514-520. For example, the binarization performed by the processor 102 and/or the CNN module 190b may extract the speckle patterns 514-520 in order to enable the processor 102 to perform disparity calculations.

The box 506 is shown with edges 582. The edges 582 may be distinctly represented. In the example shown, the edges 582 are shown as distinct to illustrate the accuracy of the resulting disparity image. The accuracy of the edges 582 may be present in the disparity map 580 because the data arrangement 300, the convolution operations and/or other neural network operations were used (e.g., the neural network operations described in association with FIGS. 5-9).

In the example shown, for the disparity map 580, the proportion of disparity error for each pixel may be approximately 1.8%. In the disparity image 550 shown in association with FIG. 10, the proportion of disparity error for each pixel may be approximately 5.7%. By implementing the neural network operations, the processor 102 may generate the disparity map 580 with an error disparity with a 3.9% reduction in response to performing the hardware accelerated convolution operations. The reduction in error disparity may enable the distinct edges 582 to be defined for the box 506 in the disparity image 580.

Figure 14:
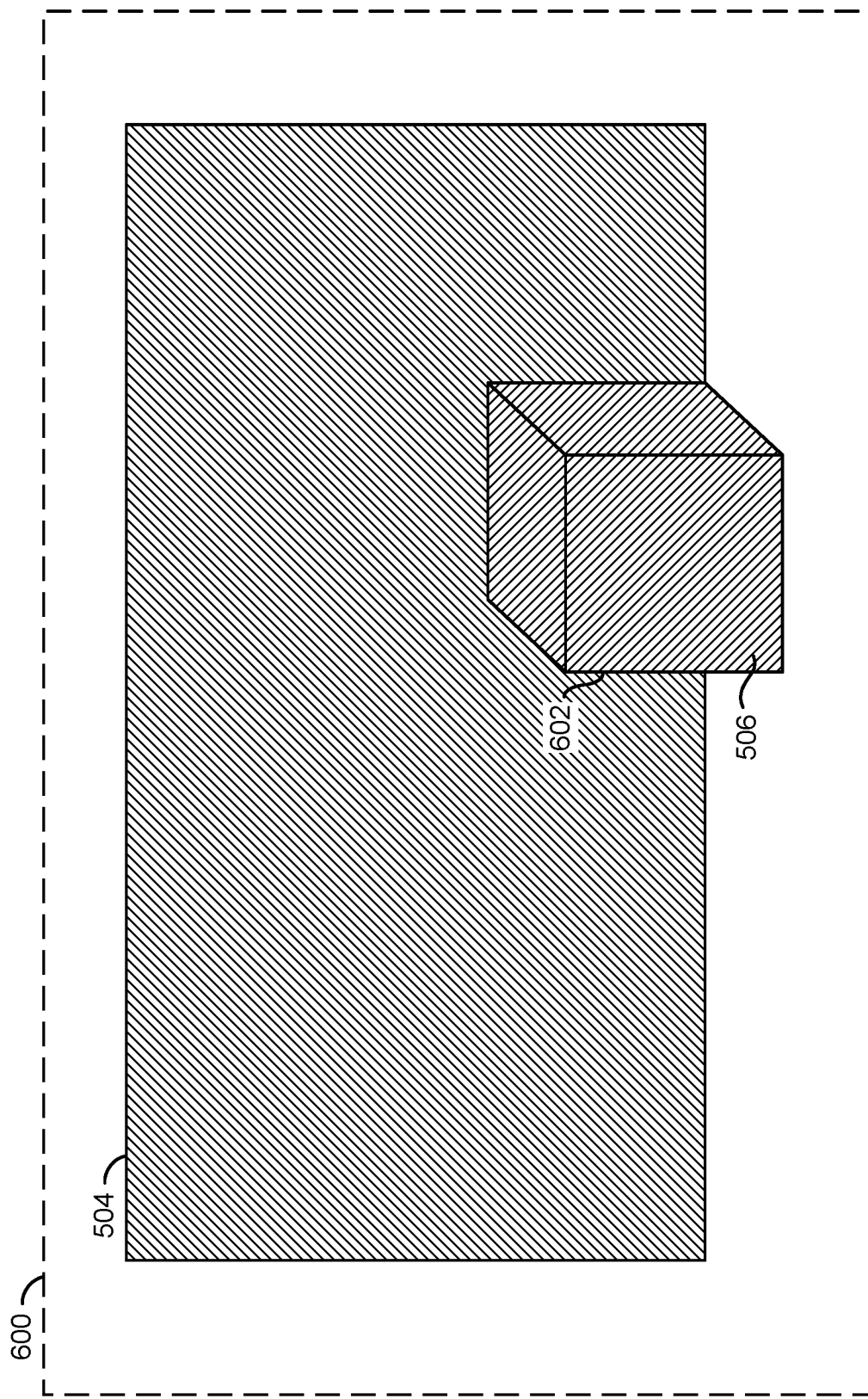
FIG. 14 is a diagram illustrating a depth map generated from a speckle image in response to implementing accelerated speckle image block matching using the convolution techniques.

Referring to FIG. 14, a diagram illustrating a depth map generated from a speckle image in response to implementing accelerated speckle image block matching using the convolution techniques is shown. A dotted box 600 is shown. The dotted box 600 may represent a depth map. The depth map 600 may be an example output generated by the processor 102 (e.g., the signal DIMAGES). In the example shown, the depth map 600 may represent the depth map 462 generated using the convolution techniques to generate the tensor of feature maps 360, the index map tensor 454 and/or the lookup data 456-458. For example, the processor 102 may be configured to generate the signal DIMAGES by using the neural network operations described in association with FIGS. 5-9.

The depth map 600 may represent a result generated by the processor 102 after the data arrangement 300, using the convolution techniques to generate the tensor of feature maps 360, the index map tensor 454 and/or the lookup data 456-458. The hardware accelerated convolution operations may be used to generate the depth map 600. In an example, one or more of the hardware modules 190a-190n implemented by the processor 102 may be configured to perform block matching operations using the data arrangement 300 of the four-dimensional tensor 310 with the video frames 352a-352n as input in order to generate the depth map 600.

The white wall 504 and the box 506 are shown in the depth map 600. The white wall 504 and the box 506 are shown without the speckle patterns 514-520. For example, the binarization performed by the processor 102 and/or the CNN module 190b may extract the speckle patterns 514-520 in order to enable the processor 102 to perform depth calculations.

The box 506 is shown with edges 602. The edges 602 may be distinctly represented. In the example shown, the edges 602 are shown as distinct to illustrate the accuracy of the resulting depth image. The accuracy of the edges 602 may be present in the depth map 600 because the data arrangement 300, the convolution operations and/or other neural network operations were used (e.g., the neural network operations described in association with FIGS. 5-9).

In the example shown, the Z-accuracy of the depth map 600 may be approximately 96.4% and the fill rate may be approximately 98.4%. In the depth image 560 shown in association with FIG. 11, the Z-accuracy may be approximately 94.3% and the fill rate may be approximately 97.3%. By implementing the neural network operations 300-400, the processor 102 may generate the depth map 600 with a 2.1% improvement in Z-ac curacy and a 1.1% improvement in fill rate after adding the hardware accelerated convolution techniques. The improvement in Z-accuracy and fill rate may enable the distinct edges 602 to be defined for the box 506 in the depth map 600.

Figure 15:
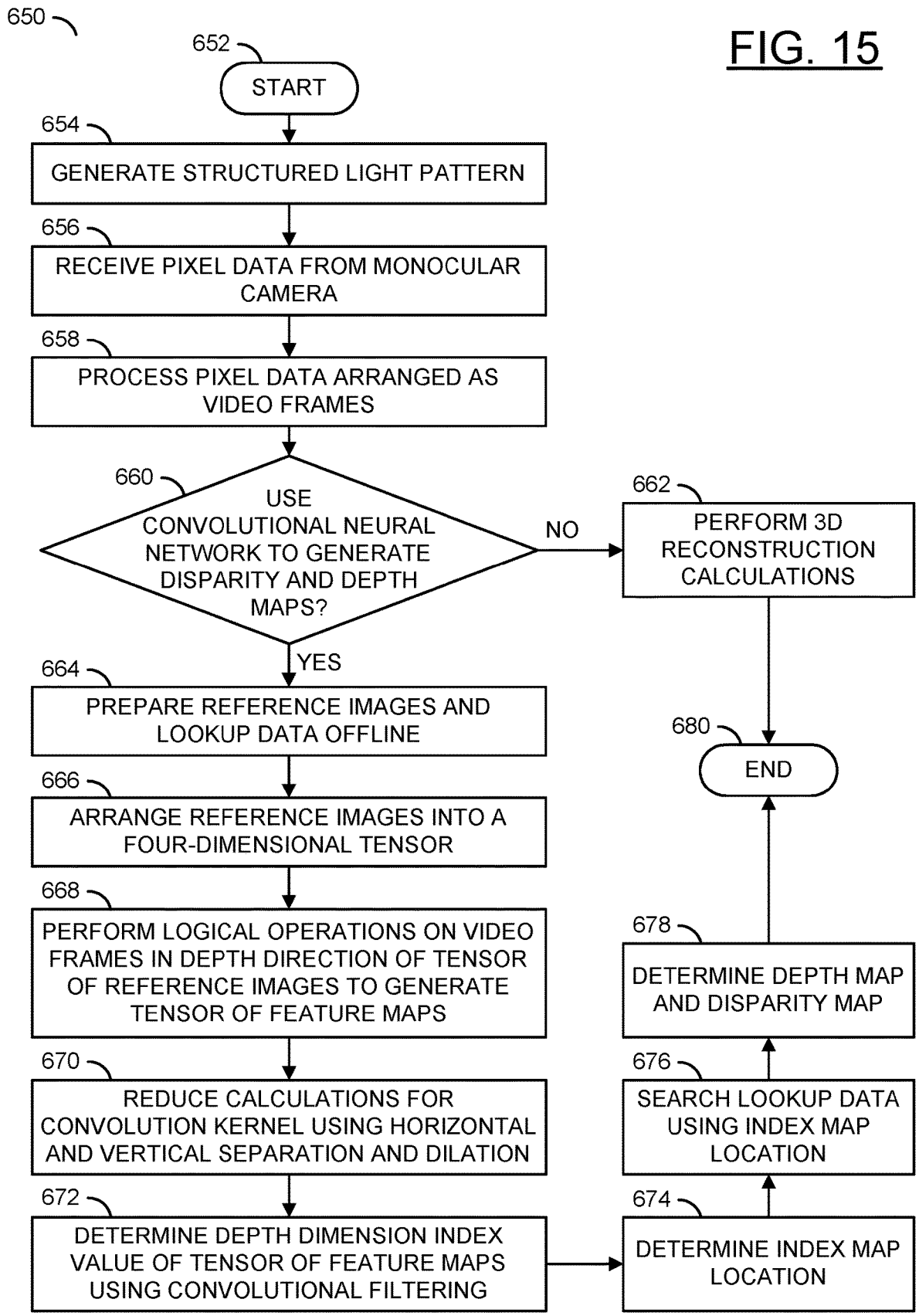
FIG. 15 is a flow diagram illustrating a method for accelerating speckle image block matching using convolution techniques.

Referring to FIG. 15, a method (or process) 650 is shown. The method 650 may accelerate speckle image block matching using convolution techniques. The method 650 generally comprises a step (or state) 652, a step (or state) 654, a step (or state) 656, a step (or state) 658, a decision step (or state) 660, a step (or state) 662, a step (or state) 664, a step (or state) 666, a step (or state) 668, a step (or state) 670, a step (or state) 672, a step (or state) 674, a step (or state) 676, a step (or state) 678, and a step (or state) 680.

The step 652 may start the method 650. In the step 654, the structured light projector 106 may generate the structured light pattern SLP. In an example, the SLP source 186 may generate the signal SLP comprising a speckle pattern that may be projected onto the environment near the apparatus 100. Next, in the step 656, the processor 102 may receive pixel data from the monocular camera. In an example, the capture device 104 may implement a monocular camera. The monocular camera 104 may receive the signal LIN comprising light via the lens 160. The RGB-IR sensor 180 may convert the input light into pixel data and/or video frames. The pixel data may comprise information about the environment near the apparatus 100 and capture the structured light pattern generated by the structured light projector 106. The monocular camera 104 may present the signal VIDEO to the processor 102. In the step 658, the processor 102 may be configured to process the pixel data arranged as video frames. In one example, the processor 102 may convert the pixel data into video frames. In another example, the capture device 104 may convert the pixel data to video frames and the video frames may be presented to the processor 102. The video frames may comprise single-channel source images. Next, the method 650 may move to the decision step 660.

In the decision step 660, the processor 102 may determine whether to utilize the CNN module 190b to generate the disparity maps and depth maps. If the CNN module 190b is not used, then the method 650 may move to the step 662. In the step 662, the processor 102 may perform various 3D reconstruction calculations without relying on the hardware acceleration provided by the CNN module 190b (e.g., slower computation path using a general purpose processor that does not rely on the hardware engines 204a-204n and/or does not accelerate speckle image block matching using convolution techniques based on the data arrangement 300 and/or the convolution separation and dilation, which may result in the inaccuracies 552 shown in the disparity map 550 and/or the inaccuracies 562 shown in the depth map 560). Next, the method 650 may move to the step 680. In the decision step 660, if the CNN module 190b is used, then the method 650 may move to the step 664. In an example, the steps 664-678 or portions of the steps 664-678 may be performed using the convolutional neural network hardware of the processor 102.

In the step 664, the processor 102 and/or the CNN module 190b may prepare the reference images 302a-302N and/or the lookup data (e.g., the disparity table 456 and the depth table 458) offline (e.g., during offline training and before the input video frames 352a-352n are received). Next, in the step 666, the CNN module 190b may be configured to arrange the reference images 302a-302N into the four-dimensional tensor of reference images 310. In the step 668, the CNN module 190b may perform the logical operations on the input video frames 352a-352n in the depth direction of the four-dimensional tensor of reference images 310 in order to generate the tensor of feature maps 360. Next, in the step 670, the CNN module 190b may be configured to reduce calculations for the convolution kernel 382 using horizontal and vertical separation and/or dilation. In the step 672, the CNN module 190b may determine a depth dimension index value of the tensor of feature maps 360 using convolution filtering (e.g., calculations performed using the four 1D small-sized convolution kernels generated from the convolution kernel 382). Next, the method 650 may move to the step 674.

In the step 674, the CNN module 190b may determine an index map location (e.g., a maximum value). Next, in the step 676, the CNN module 190b may search the lookup data (e.g., the disparity lookup table 456 and the depth lookup table 458) using the index map location 454. In the step 678, the CNN module 190b may determine the disparity map 460 and the depth map 462 based on the lookup data. Next, the method 650 may move to the step 680. The step 680 may end the method 650.

Figure 16:
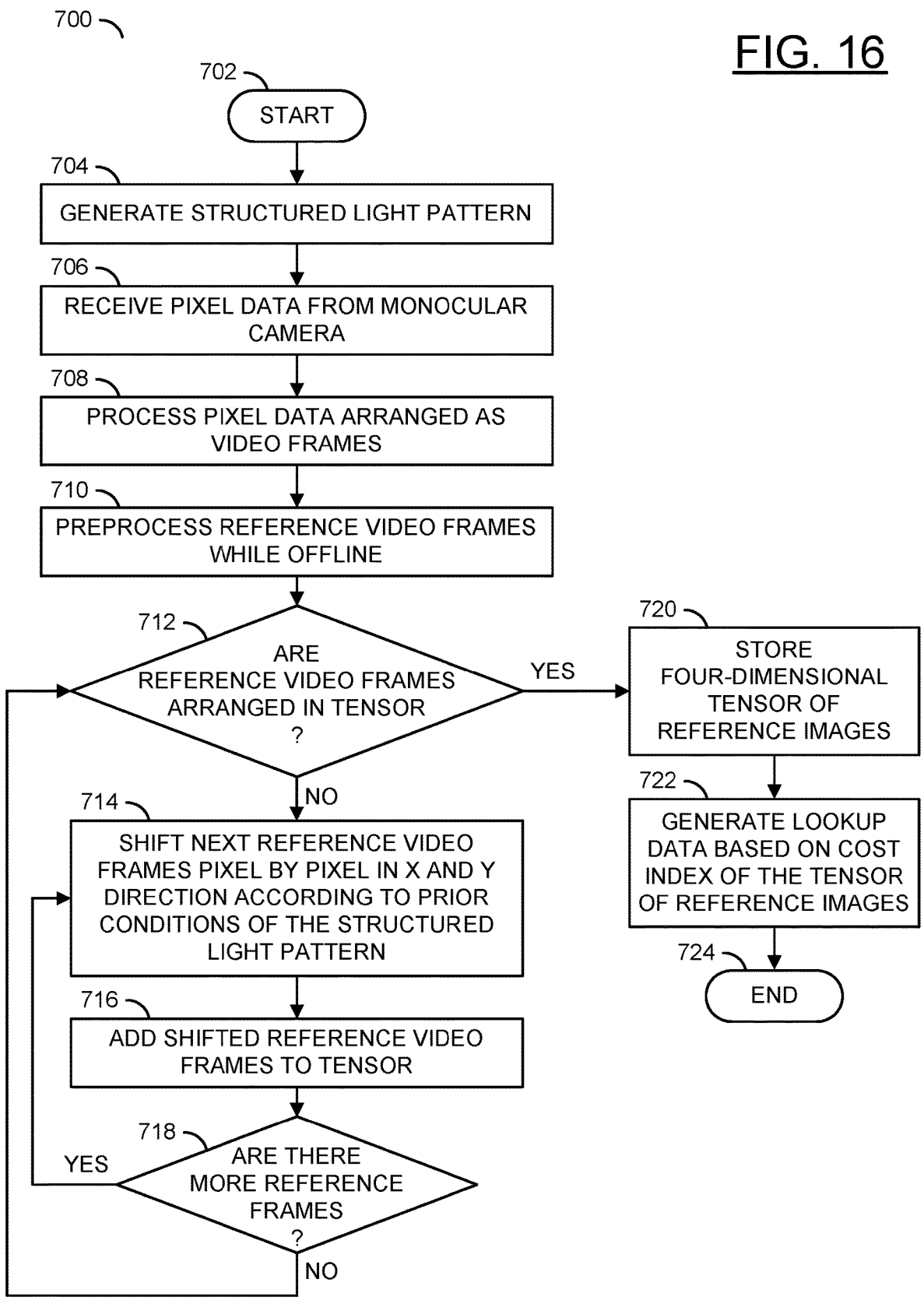
FIG. 16 is a flow diagram illustrating a method for performing data arrangement to generate a four-dimensional tensor of reference images.

Referring to FIG. 16, a method (or process) 700 is shown. The method 700 may perform data arrangement to generate a four-dimensional tensor of reference images. The method 700 generally comprises a step (or state) 702, a step (or state) 704, a step (or state) 706, a step (or state) 708, a step (or state) 710, a decision step (or state) 712, a step (or state) 714, a step (or state) 716, a decision step (or state) 718, a step (or state) 720, a step (or state) 722, and a step (or state) 724.

The step 702 may start the method 700. In the step 704, the structured light projector 106 may generate the structured light pattern SLP. Next, in the step 706, the processor 102 may receive pixel data from the monocular camera 104. In the step 708, the processor 102 may be configured to process the pixel data arranged as video frames. The video frames may comprise the single-channel reference images 302a-302N. In the step 708, the processor 102 and/or the CNN module 190b may preprocess the reference video frames 302a-302N while offline. In one example, the reference images 302a-302N may be acquired and preprocessed before the pixel data for the input video images 352a-352n are generated by the capture device 104 and arranged as video frames by the processor 102. For example, the reference video frames 302a-302N may be preprocessed and/or arranged during a training process for the camera system 100. The reference images 302a-302N may be presented to the preprocessing block 354. The preprocessing block may preprocess the reference images 302a-302N. Next, the method 700 may move to the decision step 712.

In the decision step 712, the processor 102 and/or the CNN module 190b may determine whether the reference video frames 302a-302N are arranged in a tensor. In an example, the CNN module 190b may be configured to arrange the reference video frames 302a-302N into the four-dimensional tensor of reference images 310 along the depth direction according to disparity (e.g., from a minimum amount of disparity to a maximum amount of disparity). If the reference video images 302a-302N have not been arranged in a tensor, then the method 700 may move to the step 714.

In the step 714, the CNN module 190b may be configured to shift a next one of the reference images 302a-302N pixel by pixel in the X direction and in the Y direction. The reference images 302a-302N may be shifted according to the prior conditions of the structured light pattern SLP. The shifted reference images 306a-306m may be generated for each of the reference frames 302a-302N that may be shifted in the X direction for each of the m number of pixels. Similarly, the shifted reference images 308a-308n may be generated for each of the reference frames 302a-302N that may be shifted in the Y direction for each of the n number of pixels. Next, in the step 716, the CNN module 190b may add the shifted reference video frames 306a-306m and the shifted reference video frames 308a-308n to the four-dimensional tensor of reference images 310. Each of the combined offset images 312a-312p generated from the reference images 302a-302N that may be added to the four-dimensional tensor of reference images 310 may be added in the depth direction according to the amount of disparity from the minimum disparity to the maximum disparity. Next, the method 700 may move to the decision step 718.

In the decision step 718, the processor 102 and/or the CNN module 190b may determine whether there are more reference images 302a-302N to arrange into the four-dimensional tensor of reference images 310. If there are more reference images 302a-302N, then the method 750 may return to the step 714. If there are not more reference images 302a-302N, then the method 750 may return to the decision step 712. While the steps 714-718 are generally shown sequentially, the steps 714-716 may be performed on each of the reference images 302a-302N in parallel (or substantially in parallel).

In the decision step 712, if the reference images 302a-302N are arranged in the four-dimensional tensor of reference images 310, then the method 700 may move to the step 720. In the step 720, the processor 102 and/or the CNN module 190b may store the four-dimensional tensor of reference images 310 in the memory 150. Next, in the step 722, the CNN module 190b may generate the lookup data based on the cost index of the tensor of reference images 310. For example, the arrangement order and the cost volume of the four-dimensional tensor of reference images 310, the disparity lookup table 456 and the depth lookup table 458 may be the same. Next, the method 700 may move to the step 724. The step 724 may end the method 700.

Figure 17:
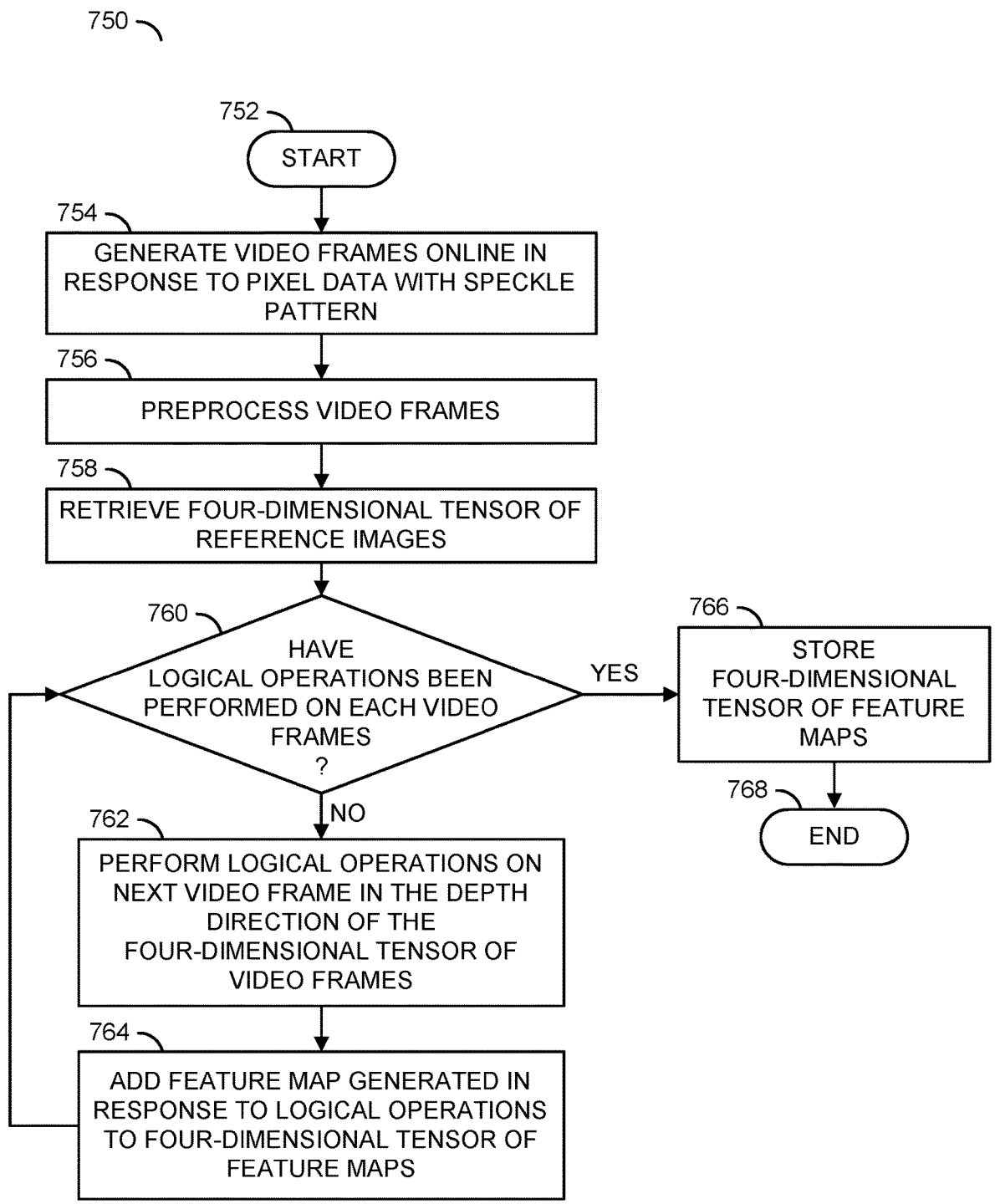
FIG. 17 is a flow diagram illustrating a method for performing logical operations on input video frames in a depth direction of a four-dimensional tensor of reference images to generate a four-dimensional tensor of feature maps.

Referring to FIG. 17, a method (or process) 750 is shown. The method 750 may perform logical operations on input video frames in a depth direction of a four-dimensional tensor of reference images to generate a four-dimensional tensor of feature maps. The method 750 generally comprises a step (or state) 752, a step (or state) 754, a step (or state) 756, a step (or state) 758, a decision step (or state) 760, a step (or state) 762, a step (or state) 764, a step (or state) 766, and a step (or state) 768.

The step 752 may start the method 750. In the step 754, the processor 102 may generate the input video frames 352a-352n online in response to pixel data comprising the speckle pattern. In an example, after the training has been completed, the camera system 100 may be operational to capture new input video frames. The structured light projector 106 may generate the structured light pattern SLP and the capture device 104 may capture the pixel data of the environment with the speckle pattern caused by the structured light pattern SLP projected onto the environment. The processor 102 may generate the input video frames 102a-102n in response to the pixel data captured. In the step 756, the preprocessing block 756 may perform preprocessing on the input video frames 352a-352n. In some embodiments, the processing may be performed by the processor 102 without using the CNN module 190b. Next, in the step 758, the CNN module 190b may retrieve the four-dimensional tensor of reference images 310 from the memory 150. Next, the method 750 may move to the decision step 760.

In the decision step 760, the CNN module 190b may determine whether the logical operations have been performed on each of the input video frames 352a-352n (or a group of the input video frames 352a-352n to enable real-time processing while new input video frames are captured). If the logical operations have not been performed on all of the input video frames 352a-352n, then the method 750 may move to the step 762.

In the step 762, the logical and/or arithmetic hardware module 204i may perform the logical operations on the next one of the input video frames 352a-352n in the depth direction of the four-dimensional tensor of reference frames 310. In one example, the logical operations may comprise the XOR operation. Next, in the step 764, the CNN module 190b may add one or more of the feature maps 362a-362p generated in response to the logical operations to the four-dimensional tensor of feature maps 360. The resulting four-dimensional tensor of feature maps 360 may be the same size as the four-dimensional tensor of reference images 310 because the cost calculation performed by the logical and/or arithmetic hardware module 204i may be element by element to generate the feature maps 362a-362p. Next, the method 750 may return to the decision step 760. While the steps 760-764 are generally shown sequentially, the steps 760-764 may be performed for each of the input video frames 352a-352n in parallel (or substantially in parallel). For example, the logical and/or arithmetic operations performed by the logical and/or arithmetic hardware module 204i may perform calculations in the depth direction automatically.

In the decision step 760, if the logical operations have been performed on each of the input video frames 352a-352n, then the method 750 may move to the step 766. In the step 766, the CNN module 190b may store the four-dimensional tensor of feature maps 360 in the memory 150 (or the shared memory 206). Next, the method 750 may move to the step 768. The step 768 may end the method 750.

Figure 18:
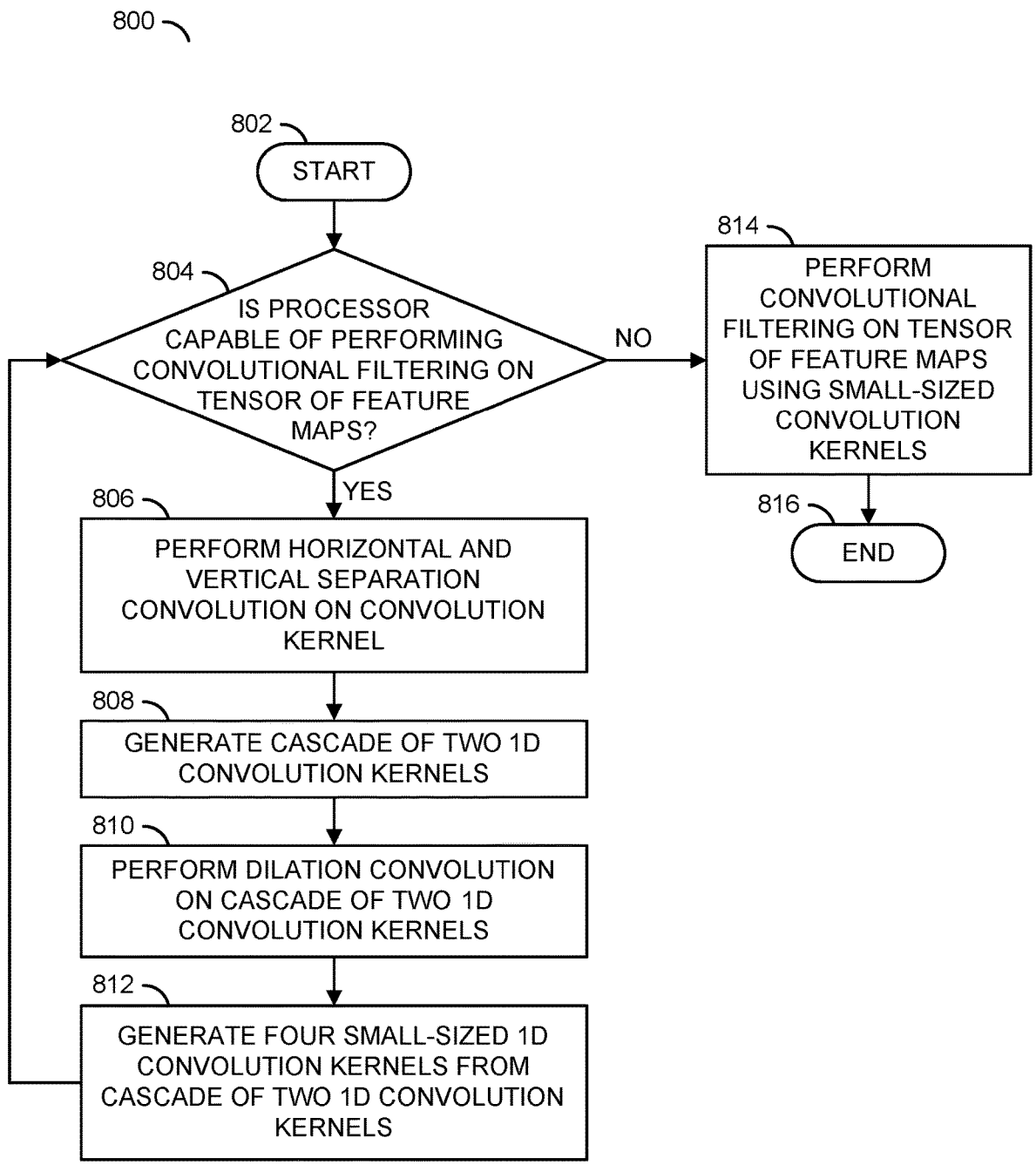
FIG. 18 is a flow diagram illustrating a method for reducing a kernel size for performing convolution operations.

Referring to FIG. 18, a method (or process) 800 is shown. The method 800 may reduce a kernel size for performing convolution operations. The method 800 generally comprises a step (or state) 802, a decision step (or state) 804, a step (or state) 806, a step (or state) 808, a step (or state) 810, a step (or state) 812, a step (or state) 814, and a step (or state) 816.

The step 802 may start the method 800. In the decision step 804, the CNN module 190b may determine whether the processor 102 is capable of performing the convolutional filtering (e.g., the convolution operator) on the tensor of feature maps 360. In an example, if the size of the convolution kernel 382 needed to perform the convolutional filtering on the tensor of feature maps 360 is larger than the maximum size of a convolution kernel supported by the processor 102, then the processor 102 may not be capable of performing the convolutional filtering. If the processor 102 is not capable of performing the convolutional filtering, then the method 800 may move to the step 806.

In the step 806, the CNN module 190b may perform a horizontal and a vertical separation convolution on the large-sized two-dimensional convolution kernel 382. Next, in the step 808, the CNN module 190b may generate the cascade of two large-sized one-dimensional convolution kernels 400 from the large-sized two-dimensional convolution kernel 382. In an example, the horizontal and vertical separation convolution may reduce a two-dimensional large-sized convolution kernel into the two large-sized one-dimensional convolution kernels 400 (e.g., reducing the computation needed for convolutional filtering from K×K to 2K). Next, the method 800 may move to the step 810.

In the step 810, the CNN module 190b may perform a dilation convolution (e.g., a hollow convolution) on the cascade of the two large-sized one-dimensional convolution kernels 400. Next, in the step 812, the CNN module 190b may generate the four small-sized one-dimensional convolution kernels 410 from the cascade of the two large-sized one-dimensional convolution kernels 400. In an example, the dilation convolution may reduce each of the two one-dimensional large-sized convolution kernels 400 into the two small-sized one-dimensional convolution kernels 410 (e.g., reducing the computation needed for convolutional filtering from 2K to 2×(K'+K"), where K is much larger than K' and K"). Next, the method 800 may return to the decision step 804.

In the decision step 804, if the processor 102 is capable of performing the convolutional filtering on the tensor of feature maps 360 (e.g., using the four small-sized one-dimensional convolution kernels 410), then the method 800 may move to the step 814. In the step 814, one or more of the hardware modules 204a-204n may perform the convolution filtering operations on the tensor of feature maps 360 using the four small-sized one-dimensional convolution kernels 410. Next, the method 800 may move to the step 816. The step 816 may end the method 800.

Figure 19:
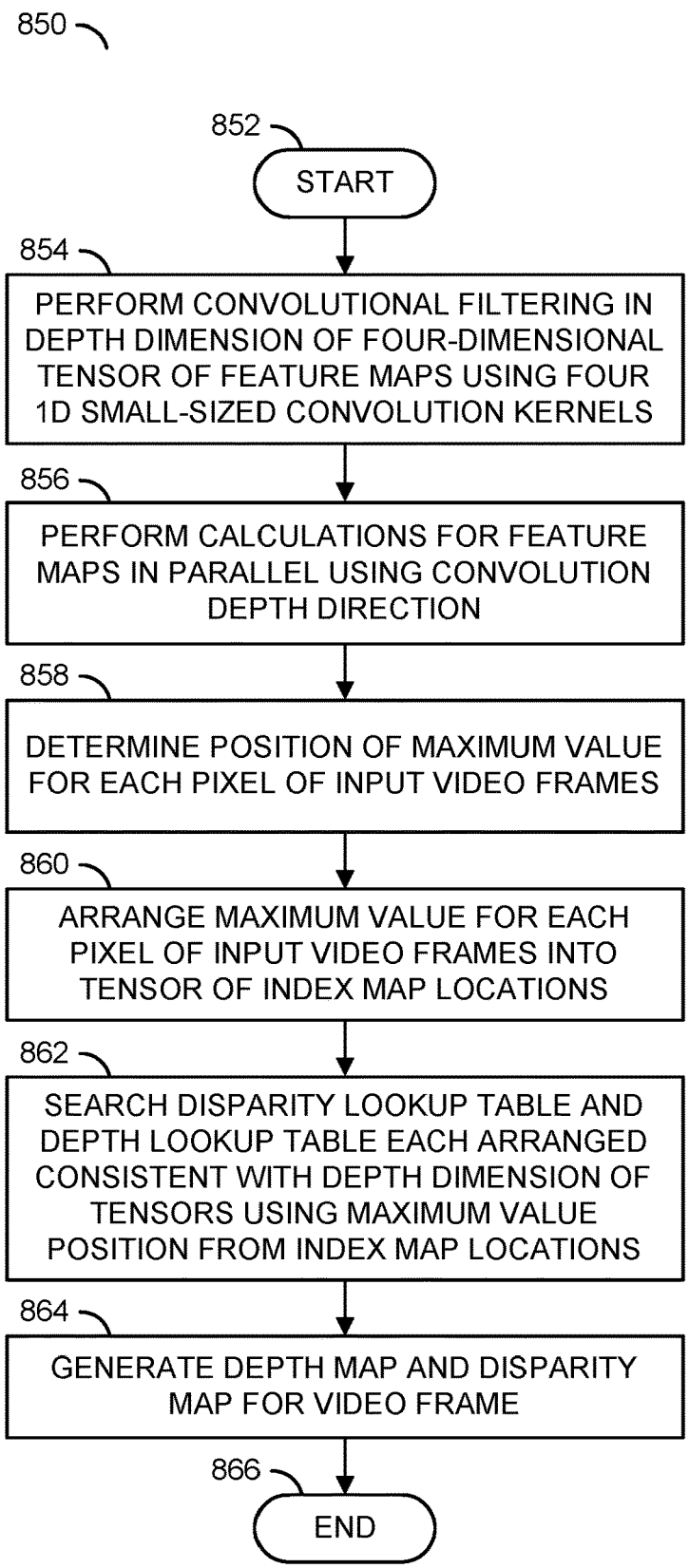
FIG. 19 is a flow diagram illustrating a method for determining an index map location for input video frames to generate depth maps and disparity maps from lookup data.

Referring to FIG. 19, a method (or process) 850 is shown. The method 850 may determine an index map location for input video frames to generate depth maps and disparity maps from lookup data. The method 850 generally comprises a step (or state) 852, a step (or state) 854, a step (or state) 856, a step (or state) 858, a step (or state) 860, a step (or state) 862, a step (or state) 864, and a step (or state) 866.

The step 852 may start the method 850. In the step 854, the CNN module 190b may perform the convolutional filtering operations in the depth dimension of the four-dimensional tensor of feature maps 360 using the four small-sized one-dimensional convolution kernels 410. The cost aggregation value 420 in the X-axis direction or the Y-axis direction may be calculated through the four small-size convolutions. The cost aggregation value 420 may comprise the sum of the kernel size windows by convolution. Generally, the cost aggregation value 420 may be too large and/or take too much time to sum directly. Separating the convolution kernel 382 into the four small-size 1D kernels 410 may accelerate determining the cost aggregation value 420. The cost aggregation value 420 may be a cost volume, which may enable finding a best cost in the depth direction for determining disparity. Next, in the step 856, the CNN module 190b may perform calculations for the tensor of feature maps 360 in parallel using the convolution depth direction. For example, the feature maps 362a-362p may be analyzed in parallel using convolution in the depth direction instead of being analyzed frame by frame (e.g., reduces processing time and/or power consumption). Next, the method 850 may move to the step 858.

In the step 858, the CNN module 190b may determine a position of a maximum value for each pixel in each of the input video frames (e.g., the feature maps 362a-362p) by using the MAXMIN operation 452. Next, in the step 860, the CNN module 190b may arrange the maximum value for each pixel of the input frames into the tensor of index map locations 454. In the step 862, the CNN module 190b may search the disparity lookup table 456 and the depth lookup table 458 using the maximum value position from the index map locations 454. The disparity lookup table 456 and the depth lookup table 458 may each be arranged consistent with the depth dimension of the tensors (e.g., the tensor of reference images 310 and the tensor of feature maps 360). Next, in the step 864, the CNN module 190b may generate the depth map 462 and the disparity map 460 for the input video frames 352a-352n. In one example, the disparity map 460 and the depth map 462 may be used internally by the processor 102 and/or the CNN module 190b. In another example, the disparity map 460 and the depth map 462 may be output by the processor 102 as the signal DIMAGES. Next, the method 850 may move to the step 866. The step 866 may end the method 850.

The functions performed by the diagrams of FIGS. 1-19 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data;
   a structured light projector configured to generate a structured light pattern; and
   a processor configured to (i) process said pixel data arranged as video frames, (ii) preprocess a plurality of reference images comprising said structured light pattern, (iii) generate lookup data and (iv) perform convolution operations to generate a disparity map and a depth map in response to (a) said video frames, (b) said structured light pattern, (c) said reference images and (d) said lookup data, wherein said processor comprises convolutional neural network hardware configured to:
   (A) arrange said plurality of reference images into a four-dimensional tensor, (B) perform logical operations on one of said video frames in a depth direction of said four-dimensional tensor to generate a tensor of feature maps of said video frames, (C) use a horizontal and vertical separation convolution and dilation to reduce an amount of calculations performed to implement convolution filtering in said depth direction of said tensor of feature maps, (D) perform said convolution filtering on said tensor of said feature maps, (E) determine a depth dimension index value in response to a maximum value calculation performed in said depth direction of said tensor of feature maps, (F) determine an index map location, and (G) search said lookup data based on said index map location to determine said disparity map and said depth map.

2. The apparatus according to claim 1, wherein said four-dimensional tensor comprises (i) a depth dimension representing a depth of offset images, (ii) a first dimension representing a total number of said reference images, (iii) a second dimension representing a height of each of said reference images and (iv) a third dimension representing a width of each of said reference images.

3. The apparatus according to claim 2, wherein said tensor of said feature maps is generated having a same size as said four-dimensional tensor.

4. The apparatus according to claim 1, wherein arranging said reference images into said four-dimensional tensor enables said logical operations to be performed in parallel in order to generate said tensor of feature maps.

5. The apparatus according to claim 1, wherein said horizontal and vertical separation convolution and said dilation are implemented to reduce an amount of calculations performed by said convolutional neural network hardware in response to (i) separating a two-dimensional convolution kernel into a cascade of an x-axis one-dimensional convolution kernel and a y-axis one-dimensional convolution kernel, (ii) decomposing said x-axis one-dimensional convolution kernel into a first one-dimensional convolution kernel and a first one-dimensional hollow kernel and (iii) decomposing said y-axis one-dimensional convolution kernel into a second one-dimensional convolution kernel and a second one-dimensional hollow kernel.

6. The apparatus according to claim 5, wherein said convolutional neural network hardware is further configured to calculate a cost aggregation value in a direction in response to said convolution operations of one or more of said first one-dimensional convolution kernel, said first one-dimensional hollow kernel, said second one-dimensional convolution kernel and said second one-dimensional hollow kernel.

7. The apparatus according to claim 6, wherein (i) said cost aggregation value comprises a cost four-dimensional tensor having a same size as said four-dimensional tensor and (ii) an image boundary of said video frames is filled.

8. The apparatus according to claim 5, wherein said first one-dimensional convolution kernel, said first one-dimensional hollow kernel, said second one-dimensional convolution kernel and said second one-dimensional hollow kernel are each a smaller size than said two-dimensional convolution kernel.

9. The apparatus according to claim 8, wherein said amount of calculations performed by said convolution filtering is achieved by reducing a number of repetitive calculations performed in said convolution operations.

10. The apparatus according to claim 1, wherein (i) said lookup data comprises a disparity table and a depth table, (ii) said disparity table and said depth table are each one-dimensional tables and (iii) said disparity table and said depth table each have a size of 1×D, where D is a depth dimension of said four-dimensional tensor.

11. The apparatus according to claim 1, wherein (i) said lookup data comprises a disparity table and a depth table and (ii) said convolutional neural network hardware is configured to search said disparity table and said depth table separately.

12. The apparatus according to claim 1, wherein said four-dimensional tensor of said reference images and said lookup data are prepared offline before said video frames are received.

13. The apparatus according to claim 12, wherein (i) said reference images are shifted pixel-by-pixel in an X direction and a Y direction according to prior conditions of said structured light pattern to generate offset images and (ii) said offset images are arranged in an order into said four-dimensional tensor of reference images.

14. The apparatus according to claim 13, wherein said order of said offset images is from a minimum disparity to a maximum disparity.

15. The apparatus according to claim 1, wherein a maximum depth dimension index map in said depth direction of said tensor of said feature maps is configured to quickly pass through said lookup data to enable said processor to obtain said disparity map and said depth map.

16. The apparatus according to claim 1, wherein said logical operations comprise performing an XOR operation between said reference images in said four-dimensional tensor and said video frames.

17. The apparatus according to claim 1, wherein said processor is configured to perform preprocessing on said video frames before said convolutional neural network hardware performs said logical operations.

18. The apparatus according to claim 1, wherein (i) said reference images in said four-dimensional tensor are used to perform pattern matching with said video frames to determine an offset and (ii) said offset is used to search said lookup data.

19. The apparatus according to claim 1, wherein (i) said depth dimension index value comprises a maximum value position for every pixel in one of said video frames, (ii) said depth dimension index value is arranged in a tensor of width w and height h and to determine said index map location and (iii) said index map location is used to search said lookup data to find a disparity and depth of said every pixel.

20. The apparatus according to claim 1, wherein operations performed by said convolutional neural network hardware is configured to provide hardware acceleration for speckle image block matching using convolution techniques.

* * * * *